United States Patent
Altberg et al.

(10) Patent No.: US 10,102,550 B2
(45) Date of Patent: *Oct. 16, 2018

(54) SYSTEMS AND METHODS TO CONNECT PEOPLE IN A MARKETPLACE ENVIRONMENT

(71) Applicant: YellowPages.com LLC, Tucker, GA (US)

(72) Inventors: Ebbe Altberg, Mill Valley, CA (US); Scott Faber, San Francisco, CA (US); Ron Hirson, San Francisco, CA (US); Sean Van Der Linden, Berkeley, CA (US)

(73) Assignee: YELLOWPAGES.COM LLC, D/FW Airport, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,016

(22) Filed: Mar. 16, 2017

(65) Prior Publication Data

US 2017/0186050 A1    Jun. 29, 2017

Related U.S. Application Data

(63) Continuation of application No. 13/903,608, filed on May 28, 2013, now Pat. No. 9,639,863, which is a
(Continued)

(51) Int. Cl.
*G06Q 30/00*    (2012.01)
*G06Q 30/02*    (2012.01)
(Continued)

(52) U.S. Cl.
CPC ......... *G06Q 30/0275* (2013.01); *G06Q 30/02* (2013.01); *G06Q 30/0207* (2013.01);
(Continued)

(58) Field of Classification Search
None
See application file for complete search history.

(56) References Cited

U.S. PATENT DOCUMENTS

| 4,313,035 A | 12/1982 | Jordan et al. |
| 4,577,065 A | 3/1986 | Frey et al. |

(Continued)

FOREIGN PATENT DOCUMENTS

| AU | 699785 | 5/1995 |
| AU | 2004202940 A1 | 4/2005 |

(Continued)

OTHER PUBLICATIONS

"User centred opportunities for supporting consumer behaviour through handheld and ubiquitous computing". 36th Annual Hawaii International Conference on System Sciences, 2003. Proceedings of the (pp. 9 pp.) K. O'Hara and M. Perry. ISBN. 0-7695-1874-5. Jan. 1, 2003.*

(Continued)

*Primary Examiner* — Maria V Vanderhorst
(74) *Attorney, Agent, or Firm* — Mark E. Stallion; Greensfelder Hamker & Gale PC

(57) ABSTRACT

Systems and methods to provide telephonic connections. In one embodiment, a method includes: providing a listing on a marketplace, the listing including an assigned reference to be used to initiate a real time communication connection; and billing for a real time communication lead generated from presenting the listing in response to a real time communication initiated via the reference. In one embodiment, a method includes: conducting online auction of telephonic leads; determining a way to present listings based at least partially on received price bids on the telephonic leads (e.g., the order of placement, the selection for placement, etc); and providing the listings with information to initiate a tel-
(Continued)

ephonic connection in a way trackable to measure a number of telephonic calls generated from presenting the listings.

20 Claims, 27 Drawing Sheets

Related U.S. Application Data continuation of application No. 13/472,249, filed on May 15, 2012, now Pat. No. 8,484,084, which is a continuation of application No. 11/467,145, filed on Aug. 24, 2006, now Pat. No. 8,180,676.

(60) Provisional application No. 60/762,013, filed on Jan. 24, 2006.

(51) Int. Cl.
    *G06Q 30/04*     (2012.01)
    *G06Q 40/04*     (2012.01)
    *H04M 15/00*     (2006.01)
    *H04L 29/12*     (2006.01)
    *H04L 29/08*     (2006.01)
    *H04M 7/00*     (2006.01)
    *G05B 19/418*     (2006.01)

(52) U.S. Cl.
    CPC ..... *G06Q 30/0256* (2013.01); *G06Q 30/0257* (2013.01); *G06Q 30/0264* (2013.01); *G06Q 30/0267* (2013.01); *G06Q 30/0273* (2013.01); *G06Q 30/0277* (2013.01); *G06Q 30/04* (2013.01); *G06Q 40/04* (2013.01); *H04L 61/2061* (2013.01); *H04L 61/605* (2013.01); *H04L 67/02* (2013.01); *H04L 67/04* (2013.01); *H04L 67/18* (2013.01); *H04M 7/003* (2013.01); *H04M 7/006* (2013.01); *H04M 15/00* (2013.01); *H04M 15/09* (2013.01); *H04M 15/51* (2013.01); *H04M 15/68* (2013.01); *H04M 2215/0192* (2013.01); *H04M 2215/0196* (2013.01); *H04M 2215/54* (2013.01); *H04M 2215/66* (2013.01)

(56) References Cited

U.S. PATENT DOCUMENTS

| | | |
|---|---|---|
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,847,890 A | 7/1989 | Solomon et al. |
| 4,850,007 A | 7/1989 | Marino et al. |
| 4,963,995 A | 10/1990 | Lang |
| 5,057,932 A | 10/1991 | Lang |
| 5,058,152 A | 10/1991 | Solomon et al. |
| 5,148,474 A | 9/1992 | Haralambopoulos et al. |
| 5,155,743 A | 10/1992 | Jacobs |
| 5,164,839 A | 11/1992 | Lang |
| 5,262,875 A | 11/1993 | Mincer et al. |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,440,334 A | 8/1995 | Walters et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Guo |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,696,965 A | 12/1997 | Dedrick |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,793,851 A | 8/1998 | Albertson |
| 5,794,221 A | 8/1998 | Egenclorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |

(56) References Cited

U.S. PATENT DOCUMENTS

| | | |
|---|---|---|
| 5,946,646 A | 8/1999 | Schena et al. |
| 5,960,416 A | 9/1999 | Block |
| 5,963,202 A | 10/1999 | Polish |
| 5,963,861 A | 10/1999 | Hanson |
| 5,974,141 A | 10/1999 | Saito |
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | D'Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,108,704 A | 8/2000 | Hutton et al. |
| 6,130,933 A | 10/2000 | Miloslaysky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,216,111 B1 | 4/2001 | Walker et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloskaysky |
| 6,269,336 B1 | 7/2001 | Ladd et al. |
| 6,269,361 B1 | 7/2001 | Davis et al. |
| 6,275,490 B1 | 8/2001 | Mattaway et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,323,894 B1 | 11/2001 | Katz |
| 6,327,572 B1 | 12/2001 | Morton et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,430,276 B1 | 8/2002 | Bouvier et al. |
| 6,434,527 B1 | 8/2002 | Horvitz |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,482,156 B2 | 11/2002 | Iliff |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,516,057 B2 | 2/2003 | Meek et al. |
| 6,523,010 B2 | 2/2003 | Lauffer |
| 6,529,878 B2 | 3/2003 | De Rafael et al. |
| 6,529,946 B2 | 3/2003 | Yokono et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 2/2004 | Newkirk |
| 6,704,403 B2 | 3/2004 | Lurie et al. |
| 6,731,736 B2 | 5/2004 | Meek et al. |
| 6,735,588 B2 | 5/2004 | Kim et al. |
| 6,760,537 B2 | 7/2004 | Mankovitz |
| 6,769,020 B2 | 7/2004 | Miyazaki et al. |
| 6,770,029 B2 | 8/2004 | Iliff |
| 6,801,899 B2 | 10/2004 | Lauffer |
| 6,807,532 B1 | 10/2004 | Kolls |
| 6,813,346 B2 | 11/2004 | Gruchala et al. |
| 6,836,225 B2 | 12/2004 | Lee et al. |
| 6,847,992 B1 | 1/2005 | Haitsuka et al. |
| 6,849,045 B2 | 2/2005 | Iliff |
| 6,850,965 B2 | 2/2005 | Allen |
| 6,856,809 B2 | 2/2005 | Fostick |
| 6,859,833 B2 | 2/2005 | Kirsch et al. |
| 6,910,035 B2 | 6/2005 | Hoekman et al. |
| 6,937,699 B1 | 8/2005 | Schuster et al. |
| 6,968,174 B1 | 11/2005 | Trandal et al. |
| 6,993,326 B2 | 1/2006 | Link, II et al. |
| 7,028,012 B2 | 4/2006 | St. Vrain |
| 7,035,381 B2 | 4/2006 | D'Ascenzo et al. |
| 7,035,468 B2 | 4/2006 | Yogeshwar et al. |
| 7,035,634 B2 | 4/2006 | Mead et al. |
| 7,065,500 B2 | 6/2006 | Singh et al. |
| 7,076,037 B1 | 7/2006 | Gonen et al. |
| 7,092,901 B2 | 8/2006 | Davis et al. |
| 7,099,306 B2 | 8/2006 | Goodman et al. |
| 7,103,010 B2 | 9/2006 | Melideo |
| 7,120,235 B2 | 10/2006 | Altberg et al. |
| 7,181,415 B2 | 2/2007 | Blaser et al. |
| 7,187,761 B2 | 3/2007 | Bookstaff |
| 7,200,413 B2 | 4/2007 | Montemer |
| 7,212,615 B2 | 5/2007 | Wolmuth |
| 7,224,781 B2 | 5/2007 | Jacob et al. |
| 7,227,936 B2 | 6/2007 | Bookstaff |
| 7,231,405 B2 | 6/2007 | Xia |
| 7,240,110 B2 | 7/2007 | Haitsuka et al. |
| 7,240,290 B2 | 7/2007 | Melideo |
| 7,249,045 B2 | 7/2007 | Lauffer |
| 7,269,162 B1 | 9/2007 | Turner |
| 7,297,108 B2 | 11/2007 | Iliff |
| 7,297,111 B2 | 11/2007 | Iliff |
| 7,300,402 B2 | 11/2007 | Iliff |
| 7,306,560 B2 | 12/2007 | Iliff |
| 7,363,254 B2 | 4/2008 | Skinner |
| 7,366,683 B2 | 4/2008 | Altberg et al. |
| 7,380,139 B2 | 5/2008 | Tagawa et al. |
| 7,401,053 B2 | 7/2008 | Kamimura et al. |
| 7,433,459 B2 | 10/2008 | Reding |
| 7,434,175 B2 | 10/2008 | Melideo |
| 7,475,149 B2 | 1/2009 | Jacob |
| 7,626,951 B2 | 12/2009 | Croy et al. |
| 7,921,052 B2 * | 4/2011 | Dabney .................. G06Q 30/08 705/35 |
| 8,140,392 B2 | 3/2012 | Altberg et al. |
| 8,175,939 B2 | 5/2012 | Howe et al. |
| 8,180,676 B2 | 5/2012 | Altberg et al. |
| 8,200,534 B2 | 6/2012 | Wong et al. |
| 8,209,225 B2 | 6/2012 | Altberg et al. |
| 8,484,084 B2 | 7/2013 | Altberg et al. |
| 8,521,596 B2 | 8/2013 | Altberg et al. |

(56) References Cited

U.S. PATENT DOCUMENTS

| | | |
|---|---|---|
| 8,538,768 B2 | 9/2013 | Agarwal et al. |
| 8,599,832 B2 | 12/2013 | Altberg et al. |
| 8,681,952 B2 | 3/2014 | Agarwal et al. |
| 8,700,461 B2 | 4/2014 | Wong et al. |
| 8,837,698 B2 | 9/2014 | Altberg et al. |
| 8,856,014 B2 | 10/2014 | Agarwal et al. |
| 8,934,614 B2 | 1/2015 | Altberg et al. |
| 9,094,486 B2 | 7/2015 | Altberg et al. |
| 9,094,487 B2 | 7/2015 | Altberg et al. |
| 9,105,032 B2 | 8/2015 | Altberg et al. |
| 9,118,778 B2 | 8/2015 | Altberg et al. |
| 9,143,619 B2 | 9/2015 | Altberg et al. |
| 9,305,304 B2 | 4/2016 | Faber et al. |
| 9,317,855 B2 | 4/2016 | Altberg et al. |
| 2001/0012913 A1 | 8/2001 | Iliff |
| 2001/0027481 A1 | 10/2001 | Whyel |
| 2001/0027559 A1 | 10/2001 | Tanabe et al. |
| 2001/0032247 A1 | 10/2001 | Kanaya |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0010608 A1 | 1/2002 | Faber et al. |
| 2002/0010616 A1 | 1/2002 | Itzhaki |
| 2002/0026457 A1 | 2/2002 | Jensen |
| 2002/0032631 A1* | 3/2002 | Rose ............... G06Q 10/10 705/37 |
| 2002/0038233 A1 | 3/2002 | Shubov et al. |
| 2002/0057776 A1 | 5/2002 | Dyer |
| 2002/0077891 A1 | 6/2002 | Castle et al. |
| 2002/0095331 A1 | 7/2002 | Osman et al. |
| 2002/0107697 A1 | 8/2002 | Jensen |
| 2002/0120554 A1 | 8/2002 | Vega |
| 2002/0122547 A1 | 9/2002 | Hinchey et al. |
| 2002/0133402 A1 | 9/2002 | Faber et al. |
| 2002/0136377 A1 | 9/2002 | Stewart et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0026397 A1 | 2/2003 | McCroskey |
| 2003/0046161 A1 | 3/2003 | Kamanger et al. |
| 2003/0050837 A1 | 3/2003 | Kim |
| 2003/0083042 A1 | 5/2003 | Abuhamdeh |
| 2003/0105824 A1 | 6/2003 | Brechner et al. |
| 2003/0135460 A1 | 7/2003 | Talegon |
| 2003/0195787 A1 | 10/2003 | Brunk et al. |
| 2003/0212600 A1 | 11/2003 | Hood et al. |
| 2003/0220837 A1 | 11/2003 | Asayama |
| 2003/0220866 A1 | 11/2003 | Pisaris-Henderson et al. |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0010518 A1 | 1/2004 | Montemer |
| 2004/0012620 A1 | 1/2004 | Buhler et al. |
| 2004/0044571 A1 | 3/2004 | Bronnimann et al. |
| 2004/0076403 A1 | 4/2004 | Mankovitz |
| 2004/0083133 A1* | 4/2004 | Nicholas ............ G06Q 30/02 705/14.52 |
| 2004/0162757 A1 | 8/2004 | Pisaris-Henderson |
| 2004/0174965 A1 | 9/2004 | Brahm et al. |
| 2004/0174974 A1 | 9/2004 | Meek et al. |
| 2004/0186769 A1 | 9/2004 | Mangold et al. |
| 2004/0193488 A1 | 9/2004 | Khoo et al. |
| 2004/0225562 A1 | 11/2004 | Turner |
| 2004/0234049 A1 | 11/2004 | Melideo |
| 2004/0235524 A1 | 11/2004 | Abuhamdeh |
| 2004/0247092 A1 | 12/2004 | Timmins et al. |
| 2004/0249649 A1 | 12/2004 | Stratton et al. |
| 2004/0249778 A1 | 12/2004 | Iliff |
| 2004/0254859 A1 | 12/2004 | Aslanian |
| 2004/0260413 A1 | 12/2004 | Melideo |
| 2005/0018829 A1 | 1/2005 | Baker |
| 2005/0033641 A1 | 2/2005 | Jha et al. |
| 2005/0041647 A1 | 2/2005 | Stinnie |
| 2005/0048961 A1 | 3/2005 | Ribaudo et al. |
| 2005/0065811 A1 | 3/2005 | Chu et al. |
| 2005/0065957 A1 | 3/2005 | Jones |
| 2005/0074100 A1 | 4/2005 | Lederman |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0096980 A1 | 5/2005 | Koningstein |
| 2005/0097204 A1 | 5/2005 | Horowitz et al. |
| 2005/0100153 A1 | 5/2005 | Pines et al. |
| 2005/0105881 A1 | 5/2005 | Mankovitz |
| 2005/0114210 A1 | 5/2005 | Faber et al. |
| 2005/0125416 A1 | 6/2005 | Kirsch et al. |
| 2005/0129193 A1* | 6/2005 | Watts ............... H04L 29/06027 379/88.17 |
| 2005/0135387 A1 | 6/2005 | Rychener et al. |
| 2005/0165666 A1 | 7/2005 | Wong et al. |
| 2005/0203796 A1 | 9/2005 | Anand et al. |
| 2005/0203799 A1 | 9/2005 | Faber et al. |
| 2005/0207432 A1 | 9/2005 | Velez-Rivera et al. |
| 2005/0209874 A1 | 9/2005 | Rossini |
| 2005/0216341 A1 | 9/2005 | Agarwal et al. |
| 2005/0222908 A1 | 10/2005 | Altberg et al. |
| 2005/0229185 A1 | 10/2005 | Stoops et al. |
| 2005/0240432 A1 | 10/2005 | Jensen |
| 2005/0245241 A1 | 11/2005 | Durand et al. |
| 2005/0251445 A1 | 11/2005 | Wong et al. |
| 2005/0261964 A1 | 11/2005 | Fang |
| 2005/0286688 A1 | 12/2005 | Scherer |
| 2005/0289015 A1 | 12/2005 | Hunter et al. |
| 2006/0003735 A1 | 1/2006 | Trandal et al. |
| 2006/0004627 A1 | 1/2006 | Baluja |
| 2006/0046759 A1 | 3/2006 | Yoon et al. |
| 2006/0069610 A1 | 3/2006 | Rossini |
| 2006/0095343 A1 | 5/2006 | Clarke et al. |
| 2006/0099936 A1 | 5/2006 | Link et al. |
| 2006/0106711 A1 | 5/2006 | Melideo |
| 2006/0136310 A1 | 6/2006 | Gonen et al. |
| 2006/0159063 A1 | 7/2006 | Kumar |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0182250 A1 | 8/2006 | Melideo |
| 2006/0184417 A1 | 8/2006 | Van der Linden et al. |
| 2006/0200380 A1 | 9/2006 | Ho et al. |
| 2006/0247999 A1 | 11/2006 | Gonen et al. |
| 2006/0259365 A1 | 11/2006 | Agarwal et al. |
| 2006/0277108 A1 | 12/2006 | Altberg et al. |
| 2006/0277181 A1 | 12/2006 | Temple et al. |
| 2007/0011240 A1 | 1/2007 | Altberg et al. |
| 2007/0022011 A1 | 1/2007 | Altberg et al. |
| 2007/0038507 A1 | 2/2007 | Kumer |
| 2007/0067219 A1 | 3/2007 | Altberg et al. |
| 2007/0078717 A1 | 4/2007 | Ho et al. |
| 2007/0081662 A1 | 4/2007 | Altberg et al. |
| 2007/0083408 A1 | 4/2007 | Altberg et al. |
| 2007/0100956 A1 | 5/2007 | Kumer |
| 2007/0116217 A1 | 5/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0124290 A1 | 5/2007 | Swanson et al. |
| 2007/0127650 A1 | 6/2007 | Altberg et al. |
| 2007/0129054 A1 | 6/2007 | Andronikov et al. |
| 2007/0130014 A1 | 6/2007 | Altberg et al. |
| 2007/0140451 A1 | 6/2007 | Altberg et al. |
| 2007/0143182 A1 | 6/2007 | Faber et al. |
| 2007/0160184 A1 | 7/2007 | Altberg et al. |
| 2007/0162296 A1 | 7/2007 | Altberg et al. |
| 2007/0174124 A1 | 7/2007 | Zagofsky et al. |
| 2007/0255622 A1 | 11/2007 | Swix et al. |
| 2007/0269038 A1 | 11/2007 | Gonen et al. |
| 2009/0067599 A1 | 3/2009 | Agarwal et al. |
| 2011/0264517 A1 | 10/2011 | Ho et al. |

(56) References Cited

U.S. PATENT DOCUMENTS

| | | |
|---|---|---|
| 2013/0013422 A1 | 1/2013 | Altberg et al. |
| 2013/0325635 A1 | 12/2013 | Altberg et al. |
| 2014/0207588 A1 | 7/2014 | Wong et al. |
| 2016/0012476 A1 | 1/2016 | Altberg et al. |
| 2016/0042406 A1 | 2/2016 | Altberg et al. |
| 2016/0050187 A1 | 2/2016 | Altberg et al. |
| 2016/0196583 A1 | 7/2016 | Altberg et al. |

FOREIGN PATENT DOCUMENTS

| | | |
|---|---|---|
| CA | 2475965 A1 | 4/2005 |
| CA | 2504623 A1 | 9/2005 |
| CA | 2506360 A1 | 10/2005 |
| CA | 2504629 A1 | 11/2005 |
| CA | 2566312 A1 | 11/2005 |
| CA | 2599184 A1 | 8/2006 |
| CA | 2599371 A1 | 8/2006 |
| CA | 2624389 A1 | 4/2007 |
| CA | 2685678 A1 | 11/2008 |
| CA | 2690837 A1 | 1/2010 |
| CN | 1836438 A | 9/2006 |
| CN | 1839405 A | 9/2006 |
| CN | 1998018 A | 7/2007 |
| CN | 101124557 A | 2/2008 |
| CN | 101258474 A | 9/2008 |
| EP | 1522944 A1 | 4/2005 |
| EP | 1636751 A2 | 3/2006 |
| EP | 1646979 A2 | 4/2006 |
| EP | 1665156 A2 | 6/2006 |
| EP | 1754187 A2 | 2/2007 |
| EP | 1759344 A2 | 3/2007 |
| EP | 1851679 A2 | 11/2007 |
| EP | 1880340 A2 | 1/2008 |
| EP | 1938566 A2 | 7/2008 |
| EP | 1977385 A2 | 10/2008 |
| EP | 1977590 A2 | 10/2008 |
| EP | 2153399 A1 | 2/2010 |
| EP | 2201521 A2 | 6/2010 |
| GB | 2329046 | 3/1999 |
| GB | 2407229 A | 4/2005 |
| GB | 2424973 A | 10/2006 |
| GB | 2425375 A | 10/2006 |
| GB | 2430767 A | 4/2007 |
| JP | 09233441 | 9/1997 |
| JP | 09319812 | 12/1997 |
| JP | 2005115945 A | 4/2005 |
| WO | WO 1997/005733 | 2/1997 |
| WO | WO 1998/002835 | 1/1998 |
| WO | WO 1998/004061 | 1/1998 |
| WO | WO 1998/013765 | 4/1998 |
| WO | WO 1998/038558 | 9/1998 |
| WO | WO 1998/047295 | 10/1998 |
| WO | WO 1999/055066 | 10/1999 |
| WO | WO 2000/057326 | 9/2000 |
| WO | WO 2001/027825 | 4/2001 |
| WO | WO 2001/028141 | 4/2001 |
| WO | WO 2002/044870 | 6/2002 |
| WO | WO 2005/040962 | 5/2005 |
| WO | WO 2005/086980 | 9/2005 |
| WO | WO 2005/101269 | 10/2005 |
| WO | WO 2005/109287 | 11/2005 |
| WO | WO 2005/109288 | 11/2005 |
| WO | WO 2005/111887 | 11/2005 |
| WO | WO 2005/111893 | 11/2005 |
| WO | WO 2006/091966 | 8/2006 |
| WO | WO 2006/091970 | 8/2006 |
| WO | WO 2007/028173 | 3/2007 |
| WO | WO 2007/038618 | 4/2007 |
| WO | WO 2007/086991 | 8/2007 |
| WO | WO 2007/086992 | 8/2007 |
| WO | WO 2008/005779 | 1/2008 |
| WO | WO 2008/033953 | 3/2008 |
| WO | WO 2008/040010 | 4/2008 |
| WO | WO 2008/040013 | 4/2008 |
| WO | WO 2008/052083 | 5/2008 |
| WO | WO 2008/058295 | 5/2008 |
| WO | WO 2008/070327 | 6/2008 |
| WO | WO 2010/005420 | 1/2010 |

OTHER PUBLICATIONS

"Applying Technology News," Accounting Technology, p. 14, Feb./Mar. 1997.
"TriNet's 'Help Me, I'm Stuck' Internet Voice Button Services Pushes Web Pages to Online Users," Business Wire, Mar. 25, 1998.
"1-800-GETCASH. (selling specialty phone numbers)". Oliver, Suzanne. Forbes, v153, n2, p. 55 (1). Jan 17, 1994.
About intellectexchange.com, Inc., company information retrieved from http://www.intellectexchange.com/ About.asp, pp. 1-12, available at least by Aug. 8, 2000.
Addeo, E.J. et al., "An Experimental Multi-Media Bridging System," Frontiers in Computer Communications Technology, Computer Communications Review, vol. 17, No. 5, pp. 236-242, Aug. 11-13, 1987.
ADS-Click, "ADS-click Adds Skype-Based Pay-Per-Call Advertising Capabilities to Its Private-Labeled Solution, which will be Unveiled at ad:tech New York," Market Wire, Oct. 10, 2005.
allexperts.com, company information retrieved from http://www.allexperts.com, available at least by Apr. 9, 2000.
Angelo, Simon, "SurfBrains.com: Brains Online Save Time & Money," M2 Presswire, Jul. 11, 2000.
answers.com, company information retrieved from http://www.answers.com, available at least by Aug. 8, 2000.
Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.
"AtOnce Talks Up E-mail Marketing Campaigns with ITXC Push to Talk Service," Business Wire, Feb. 26, 2001.
Bazini, Liz, "UpSnap Selects LookSmart to Sell Premium Listings on Free 411 Service for Text-Enabled Cell Phones," Nov. 4, 2004.
Becker, Ralph, "ISDN Tutorial: Definitions," retrieved from http://www.ralphb.net/ISDN/defs.html, available at least by Apr. 21, 2000.
Becker, Ralph, "ISDN Tutorial: Interfaces," retrieved from http://www.ralphb.net/ISDN/ifaces.html, available at least by Apr. 21, 2000.
Broad, Doug et al., "Lucent Technology and Netscape Team to Deliver Lucent Ecommerce Solutions," Business Wire, Sep. 23, 1998.
Chimiak, William H. et al., "Multimedia Collaborative Remote Consultation Tools via Gigabit WAN in Teleradiology," IEEE 13th Annual International Phoenix Conference on Computers and Communications, pp. 417-423, Apr. 12-15, 1994.
Clark, Don, "keen.com Plans Web Service Allowing Customers to Hold Private Phone Chats," Wall Street Journal, Nov. 8, 1999.
Collett, Stacey et al., "Why Online Browsers Don't Become Buyers," Computerworld, vol. 33, No. 48, p. 14, Nov. 29, 1999.
"Connecting to On-Line Car Shoppers: Auto Sellers Use Netcall Internet Call-Button Technology to Turn 'Clicks' into Interactive Sales," Business Wire, p. 4089, Jul. 19, 1999.
Dalton, Gregory, "Rent-An-Expert on the Web," Information Week, p. 75, Sep. 6, 1999.
Davey, Tom, "Wheeling and Dealing Online," PC Week, vol. 13, No. 45, pp. 1, 129, Nov. 11, 1996.
De Lasser, Eleena, "When Business Plan and Real World Clash," Wall Street Journal, p. B1, Jun. 1999.
Drescher, Bob et al., "Aspect Telecommunications Integrates the Web into the Call Center to Deliver New Level of Customer Service," Business Wire, Aug. 5, 1996.
Dyson, Esther, "Information, Bid and Asked," Forbes, p. 92, Aug. 20, 1990.
eBay, Inc., "Ebay PayPal Skype Acquisition of Skype", presentation, www.emory.edu/business/readings/voip/eBay-Skype.pdf available as early as Sep. 12, 2005.
Ek, Brian, "Walker Digital Issued Landmark U.S. Pat. No. 5,862,223 for Global Internet Marketplace for Experts", Business Wire, Jan. 26, 1999.

(56) References Cited

OTHER PUBLICATIONS

Ellis, James E., "For Telesphere's Clients, Dial 1-900 Tuf Luck," Business Week, pp. 88-89, Sep. 9, 1991.
eStara, Inc., "Pay Per Call is Not a Peer-to-Peer Application", http://www.estara.com/aboutus/news/ebay/php, Sep. 13, 2005.
exp.com, Inc., company information retrieved from http://www.exp.com, available at least by Sep. 20, 2000.
expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
Green Digital Media, Inc., Big Green Blog: Jan. 2005 Archives, Jan. 28-31, 2005.
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Greenblatt, Ellen, "Have You Ever Wondered . . . ," Datamation, p. 126, Oct. 1997.
Griffiths, J.W.R. et al., "Multimedia Communication in a Medical Environment," Singapore International Conference on Networks, pp. 166-171, Sep. 5, 1991.
Hase, Masahiko et al., "Advanced Videophone System Using Synchronized Video Filing Equipment," NTT Review, vol. 3, No. 4, pp. 29-36, Jul. 1991.
Healey, John, "From A-Z: You Can Sell Advice Online," San Jose Mercury News, retrieved from http://www. mercurycenter.com on Oct. 24, 2001.
Herman, Edith, "U.S. Courts to Launch First Federal 900 Service," Federal Computer Week, pp. 8, 10, Sep. 28, 1992.
Herzberg, Amir et al., "MiniPay: Charging Per Click on the Web," Computer Networks and ISDN Systems, vol. 29, pp. 939-951, Sep. 1997.
Hodgson, Cynthia, "Online Expert Databases & Services," Econtent, pp. 48-53, Dec. 1999.
Information Markets Corp., company information retrieved from http://www.infomarkets.com, available at least by Aug. 8, 2000.
Ingenio, Inc., "FindWhat.com Enters Agreement with Ingenio to Offer Pay Per Call Advertising Platform," press release available at http://www.ingenio.com, Apr. 7, 2004.
Ingenio, Inc., "Keen: Your Personal Advisor," retrieved from http://www.keen.com, available at least by Feb. 4, 2006.
Ingenio, Inc., Press Archives for 2004, retrieved from http://www.ingenio.com on Feb. 21, 2006.
International Application No. PCT/US01/48284, International Search dated May 13, 2002.
International Application No. PCT/US05/12061, Written Opinion and International Search Report, dated Nov. 17, 2006.
International Application No. PCT/US06/37712, Written Opinion and International Search Report, dated Aug. 8, 2007.
International Application No. PCT/US06/44175, Written Opinion and International Search Report, dated Sep. 25, 2007.
"ITXC Corp and Doubleclick Energize Banner Ads with Web Telephony; Companies Voice-Enable Banner Using ITXC Push to Talk Service," Business Wire, Dec. 12, 2000.
Jainschigg, John, "The Click-to-Call Challenge," Computer Telephony, vol. 8, No. 3, p. 58, Mar. 2000.
Jambo, "Welcome to Jambo—The Leader in Pay-Per-Call Solutions," company information retrieved from http://www. jambo.com, available at least by Oct. 17, 2005.
Jarvie, Barbara, "Company Devoted to Hot-Line Support," Computer Reseller News, p. 48, Oct. 21, 1991.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
Jyve Corporation, "Jyve Solutions :: Skype Card", http://plugin.jyve.com/skypecard/, available as early as Sep. 26, 2005.
Jyve Corporation, "Skype Card—jyvetestl", http://skypecard.jyve.com/jyvetest1.htm, available as early as Sep. 26, 2005.
Jyve Corporation, "Skype Portal—Jyve", http://www.jyve.com/, available as early as Sep. 26, 2005.
Kabeya, Kiyoshi et al., "A New Teleconsultation Terminal System Using ISDN," NTT Review, vol. 3, No. 4, pp. 37-43, Jul. 1991.
Kanellos, Michael, "Web Watch: Do You Want to Know the Meaning of Life?," Computer Reseller News, pp. 72-74, Mar. 3, 1997.
"keen.com raises $60 Million from Prestigious Investors and Strategic Partners Just 60 Days After Launch of Its Live Answer Community," Business Wire, Jan. 11, 2000.
keen.com, company information retrieved from http:llwww.keen.com, available at least by 1999.
keen.com, "keen.com Launches First Live Answer Community, Connects People with Information to Share Over Their Standard Telephone," company press release, Nov. 8, 1999.
Kuehn, Richard A., "The Voice of Technology," Credit World, pp. 20-23, Jul. 1994.
Littleton, Linda, "HDD: A Helpdesk Database," Proceedings of the ACM SIGUCCS User Services Conference XXII, pp. 205-210, Oct. 16-19, 1994.
Ludwig, L.F. et al., "Laboratory for Emulation and Study of Integrated and Coordinated Media Communication," Conference on Office Information Systems, pp. 283-291, Mar. 23-25, 1988.
Melideo, John, U.S. Appl. No. 60/471,535 entitled "HyperDial," filed May 19, 2003.
Menn, Joseph, "An Expert? There's Now a Home for You on the Internet," Los Angeles Times, retrieved from http:// www.denverpost.com on Oct. 24, 2001.
Mercalli, Franco et al., "The ESSAI Teleshopping System: An Example of a Broadband Multimedia Application," IEEE Global Telecommunications Conference, pp. 572-576, Nov. 28, 1994.
Moore, Michael et al., "USA Global Link Brings Interactively to Internet Shopping," Business Wire, Oct. 7, 1998.
"NetCall Internet Call Buttons Enhance E-Commerce Customer Service and Sales," PR Newswire, p. 7431, Aug. 9, 1999.
Ott, Chris, "Making Good on the Information Economy," Denver Business Journal, vol. 51, No. 17, p. 27A, Dec. 17, 1999.
Parker, Pamela, "EBay Jumps on Pay-Per-Call Bandwagon with Skype Buy", http://www.clickz.com/news/print. php/3548041, Sep. 12, 2005.
Pelline, Jeff, "Net Firm to Connect Users by Phone," CNET News.com, Nov. 8, 1999.
qcircuit.com, company information retrieved from http://www.qcircuit.com, available at least by Aug. 8, 2000.
Reding, Craig et al., U.S. Appl. No. 09/596,466 entitled "Methods and Apparatus for Providing Telephone Support for Internet Sales," filed Jun. 19, 2000.
Robinson, John, "Attachmate Ready to Answer Net Questions," Network World, p. 37, Apr. 8, 1996.
Rogers, Michael et al., "Experts Abound at New Web Sites," Library Journal, pp. 22-24, Mar. 1, 2000.
Sairamesh, Jakka et al., "NetBazaar: Networked Electronic Markets for Trading Computation and Information Services," Second European Conference on Research and Advanced Technology for Digital Libraries, pp. 839-856, Sep. 21, 1998.
"Sell and Buy Advice Online," The Ottawa Citizen, p. D7, Nov. 29, 1999.
Skype, Inc., "eBay to Acquire Skype", http://www.skype.com/company/news/2005/skype_ebay.html, Sep. 12, 2005.
Tehran, Rich, "e-Rip Van Winkle and the 60-second Nap," Call Center Solutions, vol. 18, No. 2, pp. 16-18, Aug. 1999.
Telecommunications Buyers Guide and Directory, Editor & Publisher, pp. 29TC-38TC, Feb. 12, 1994.
U.S. District Court, Southern District of New York, *Keen.com, Inc.* v. *InfoRocket.com, Inc.*, Preliminary Injunction Hearing, pp. 286-289, Jan. 8, 2002.

(56) References Cited

OTHER PUBLICATIONS

U.S. District Court, Southern District of New York, *Keen.com, Inc. v. InfoRocket.com, Inc.*: Complaint for Patent Infringement, Trade Dress Infringement and Unfair Competition; Demand for Jury Trial, Aug. 31, 2001.
U.S. Appl. No. 60/552,124, "Method and apparatus to provide pay-per-call advertising and billing," Unpublished (filed Mar. 10, 2004), (Scott Faber, Inventor).
U.S. Appl. No. 60/560,926, "Method and apparatus to track demand partners in a pay-per-call performance based advertising system," Unpublished (filed Apr. 9, 2004), (Scott Faber, Inventor).
United States Patent and Trademark Office, Corrected Notice of Allowability for U.S. Appl. No. 13/903,608, Mar. 30, 2017, 3 pages, U.S.A.
United States Patent and Trademark Office, Notice of Allowance for U.S. Appl. No. 13/903,608, dated Dec. 20, 2016, 15 pages, U.S.A.
United States Patent and Trademark Office, Office Action for U.S. Appl. No. 13/903,608, dated Jun. 30, 2015, 26 pages, U.S.A.
United States Patent and Trademark Office, Office Action for U.S. Appl. No. 13/903,608, dated Feb. 1, 2016, 10 pages, U.S.A.
United States Patent and Trademark Office, Office Action for U.S. Appl. No. 13/903,608, dated Aug. 22, 2016, 20 pages, U.S.A.
United States Patent and Trademark Office, Office Action for U.S. Appl. No. 13/903,608, dated Mar. 20, 2014, 81 pages, U.S.A.
United States Patent and Trademark Office, Office Action for U.S. Appl. No. 13/903,608, dated Feb. 12, 2015, 24 pages, U.S.A.
United States Patent and Trademark Office, Office Action for U.S. Appl. No. 13/903,608, dated Oct. 17, 2013, 25 pages, U.S.A.
University of Texas—Austin, information on the Electronic Emissary Project retrieved at www.tapr.org/ emissary, available at least by Apr. 9, 2000.
USPTO, Notice of Allowance for U.S. Appl. No. 11/467,145, dated Feb. 1, 2012, 10 pages, USA.
USPTO, Notice of Allowance for U.S. Appl. No. 13/472,249, dated May 20, 2013, 10 pages, USA.
USPTO, Office Action for U.S. Appl. No. 11/467,145, dated Aug. 4, 2011, 23 pages, USA.
USPTO, Office Action for U.S. Appl. No. 11/467,145, dated Jan. 28, 2011, 21 pages, USA.
USPTO, Office Action for U.S. Appl. No. 11/467,145, dated Jul. 8, 2010, 25 pages, USA.
USPTO, Office Action for U.S. Appl. No. 13/472,249, dated Feb. 13, 2013, 21 pages, USA.
Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.
Wasik, Joann M., "Information for Sale: Commercial Digital Reference and AskA Services," Virtual Reference Desk, http://www.vrd_org/AskNcommAskAhtml, Sep. 20, 1999.
Wieland, Heidi et al., "Expertcity.com Launches Premier Online Marketplace for Expert Services," PR Newswire, Aug. 30, 1999.
Wood, Christina, "Hidden Cost of Tech Support," PC World, pp. 143-152, 156, May 1995.
You're calling for . . . who?(Mobile Biz Buzz(TM))(phone number recycling). Hunter, Buzz. Mobile Business Advisor, 22, 5, 38(1 ). Sep. 2004.

\* cited by examiner

FUNCTIONAL DESCRIPTION OF SYSTEM

112

Create you ad by entering a headline, two lines of description and a phone number Example:

Bert's Plumbing
Best Plumbers in San Francisco
800-555-5407
Interest ▭

To maximize your conversion rate and your ad's position, be as specific as possible in the description lines, and be sure you meet the requirements for ad format and content listed in the Editorial Guidelines Headline (maximum 26 characters)
| Bert's Plumbing |

Description line 1 (maximum 36 characters)
| Best Plumber in San Francisco! |

Description line 2 (maximum 36 characters)
| 24/7/365. Guaranteed cheapest rates |

Phone number
| 415-555-6823 |

[ Create Ad & Continue >> ]

Google [Plumbing San Francisco]

Plumbing – San Francisco
Plumbing 1 – San Francisco
Plumbings – San Francisco
Plumber's of San Francisco
Scott's Plumbing Services
Better Homes - Plumbing Bert's Plumbing
San Luca Plumbing
San Fran Plumbing

- Create an account on ingenio
- Create ad (see left)
- Determine keywords and geography (city, state, zip, etc.)
- Determine bid amounts daily budget
- Launch campaign
- Unique 800# is automatically generated and rendered in advertisement. 800# redirects to LONON's actual phone number
- LONON pays for each phone call received

SCROLL DOWN to see more listings     Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no oblication and no hassle. Serious buyers only please.

FEATURED DIRECTORY LISTINGS     scroll down for more listings

Dream Car Rentals            Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold

RENT-A-VETTE
5021 SWENSON STREET
LAS VEGAS, NV 89119
Phone: (702) 555-2692
Fax: (702) 555-2044

ONLINE LISTINGS            scroll down for more listings

Expedia: For All Your Car Rental Needs   http://www.expedia.com
Save with Expedia.com, your one-stop source for flights, hotels, vacation packages, cruises, and rental

FIG. 9

InstantConnect!

Enter your phone number below. We'll call you and connect you immediately to the Seller to get your question answered Area Code       Phone Number ☐ Yes, I use this phone line to access the internet with my modem Submit

FIG. 21

┌─────────────────────────────────────────────────────────────────┐ ⟵ 2601
│ Overview | Bids | Call Date                         │
│                                                                 │
│ For Listing:   [ All Listings      ▽ ]                          │
│         2603⟶                                                   │
│ Time Period:  ○ [ Month to Date    ▽ ]                          │
│                                                                 │
│         2603⟶ ⦿ from [ 10/3/2003 ] to [ 11/10/2003 ] Please enter date in mm/dd/yyyy format │
│ Calls:         [ Charged Calls    ▽ ]  [ View calls ]           │
│                                                                 │
│ Calls for All Listings for Oct 3, 2003 – Nov 10, 2003   │
│ ─────────────────────────────────────────────────────────────── │
│                                              Amount   Next      Amount │
│ Call ID   Bid ID    Listing Title   Call Date   Charged  Highest Bid   Bid │
│ 5717848   428566   Jim's Professional Plumbing   Oct 29 2:24 PM   $13.01   $13.00   $15.00 │
│ 5717656   428566   Jim's Professional Plumbing   Oct 29 2:14 PM   $14.01   $14.00   $15.00 │
└─────────────────────────────────────────────────────────────────┘

FIG. 26

SYSTEMS AND METHODS TO CONNECT PEOPLE IN A MARKETPLACE ENVIRONMENT

RELATED APPLICATIONS

This application is a continuation application of U.S. patent application Ser. No. 13/903,608, filed on May 28, 2013, entitled "SYSTEM AND METHODS TO CONNECT PEOPLE IN A MARKETPLACE ENVIRONMENT", which application is a continuation application of U.S. patent application Ser. No. 13/472,249, filed on May 15, 2012, entitled "SYSTEM AND METHODS TO CONNECT PEOPLE IN A MARKETPLACE ENVIRONMENT", which application is a continuation application of U.S. patent application Ser. No. 11/467,145, filed Aug. 24, 2006, issued as U.S. Pat. No. 8,180,676 on May 15, 2012, and entitled "SYSTEMS AND METHODS TO CONNECT PEOPLE IN A MARKETPLACE ENVIRONMENT", which application claims priority to Prov. U.S. Pat. App. Ser. No. 60/762,013, filed on Jan. 24, 2006, entitled "SYSTEMS AND METHODS TO CONNECT PEOPLE IN AN AUCTION ENVIRONMENT", the entire disclosures of which applications are incorporated herein by reference.

TECHNOLOGY FIELD

At least some embodiments of the present invention relate to telephonic connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY OF THE DESCRIPTION

Systems and methods to provide telephonic connections are presented. Some embodiments are summarized in this section.

In one embodiment, a method includes: providing a listing on a marketplace, the listing including an assigned reference to be used to initiate a real time communication connection; and billing for a real time communication lead generated from presenting the listing in response to a real time communication initiated via the reference. In one embodiment, a method includes: conducting online auction of telephonic leads; determining a way to present listings based at least partially on received price bids on the telephonic leads (e.g., the order of placement, the selection for placement, etc); and providing the listings with information to initiate a telephonic connection in a way trackable to measure a number of telephonic calls generated from presenting the listings.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 8A shows an example of a user interface that may be presented to a user during advertisement creation, in accordance with one embodiment of the present invention.

FIG. 9 shows an example of a search engine result page, which includes an advertisement generated, in accordance with one embodiment of the present invention.

FIG. 21 illustrates an example of a user interface to receive a callback phone number to connect a customer to a seller according to one embodiment of the present invention.

FIG. 26 illustrates an example of a user interface to track call activities according to one embodiment of the present invention.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
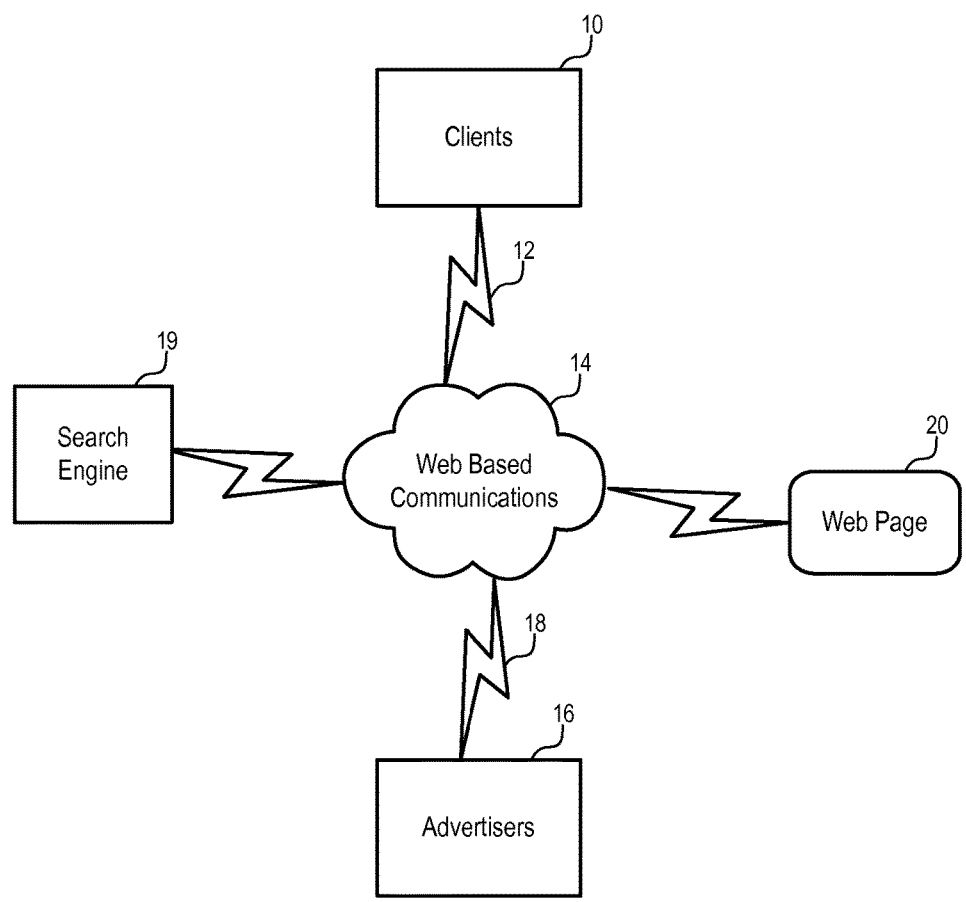
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
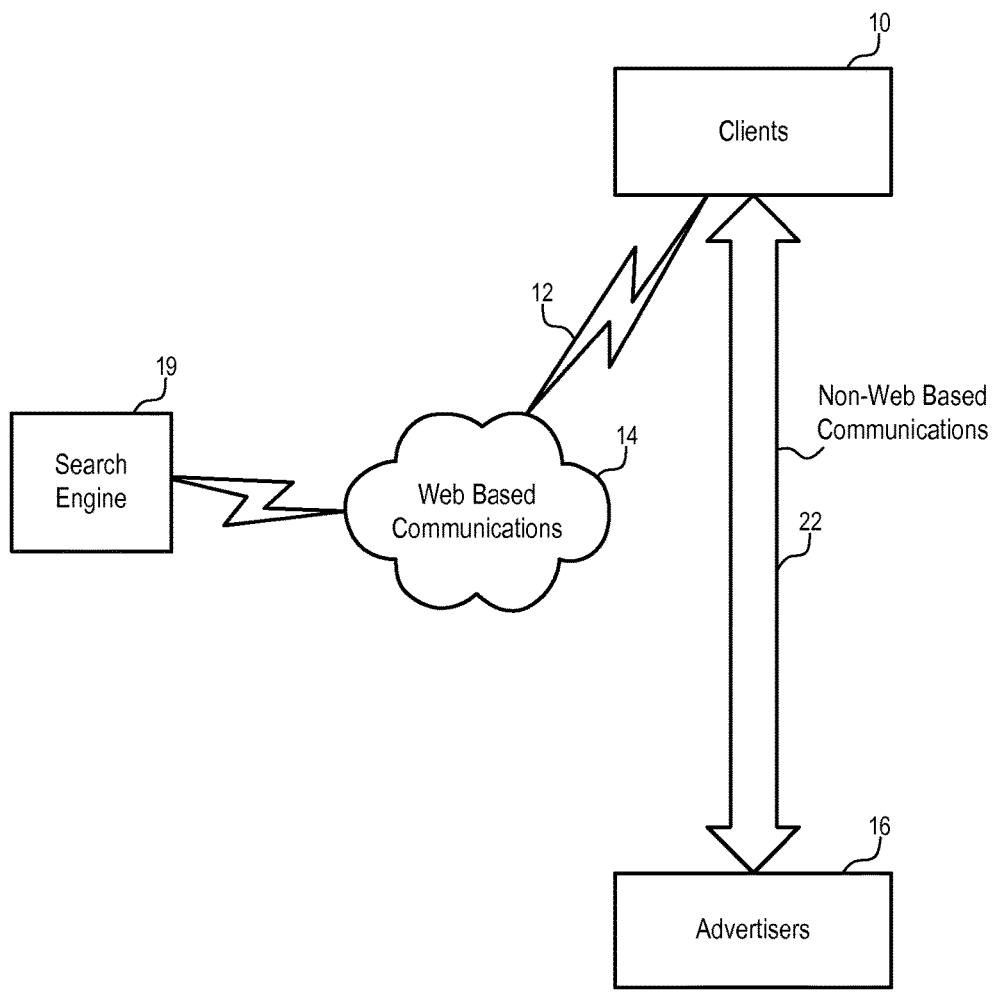
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
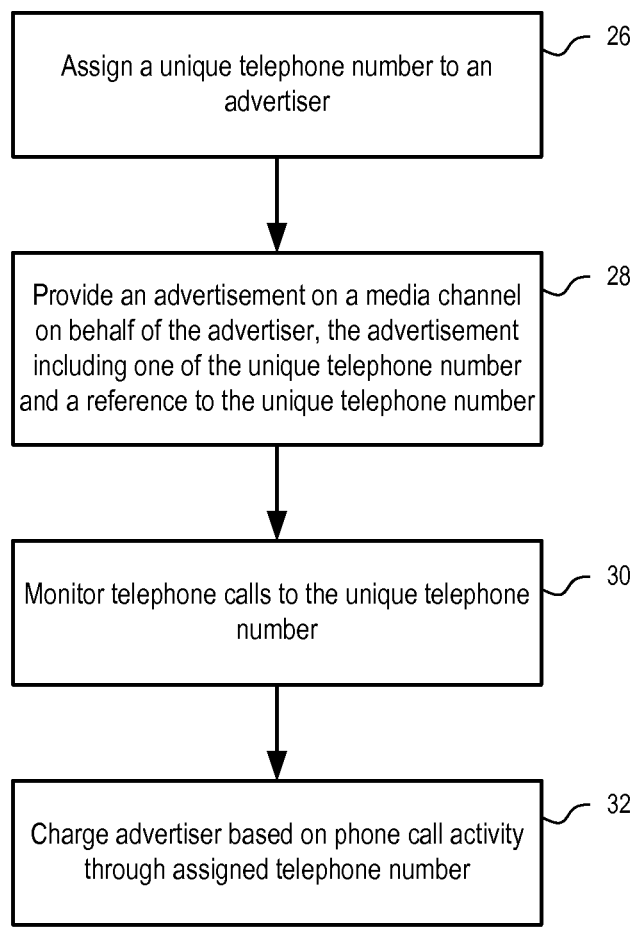
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
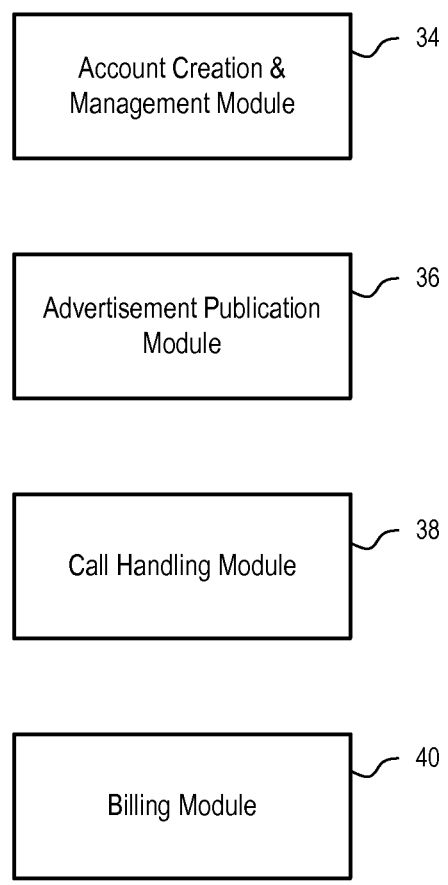
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
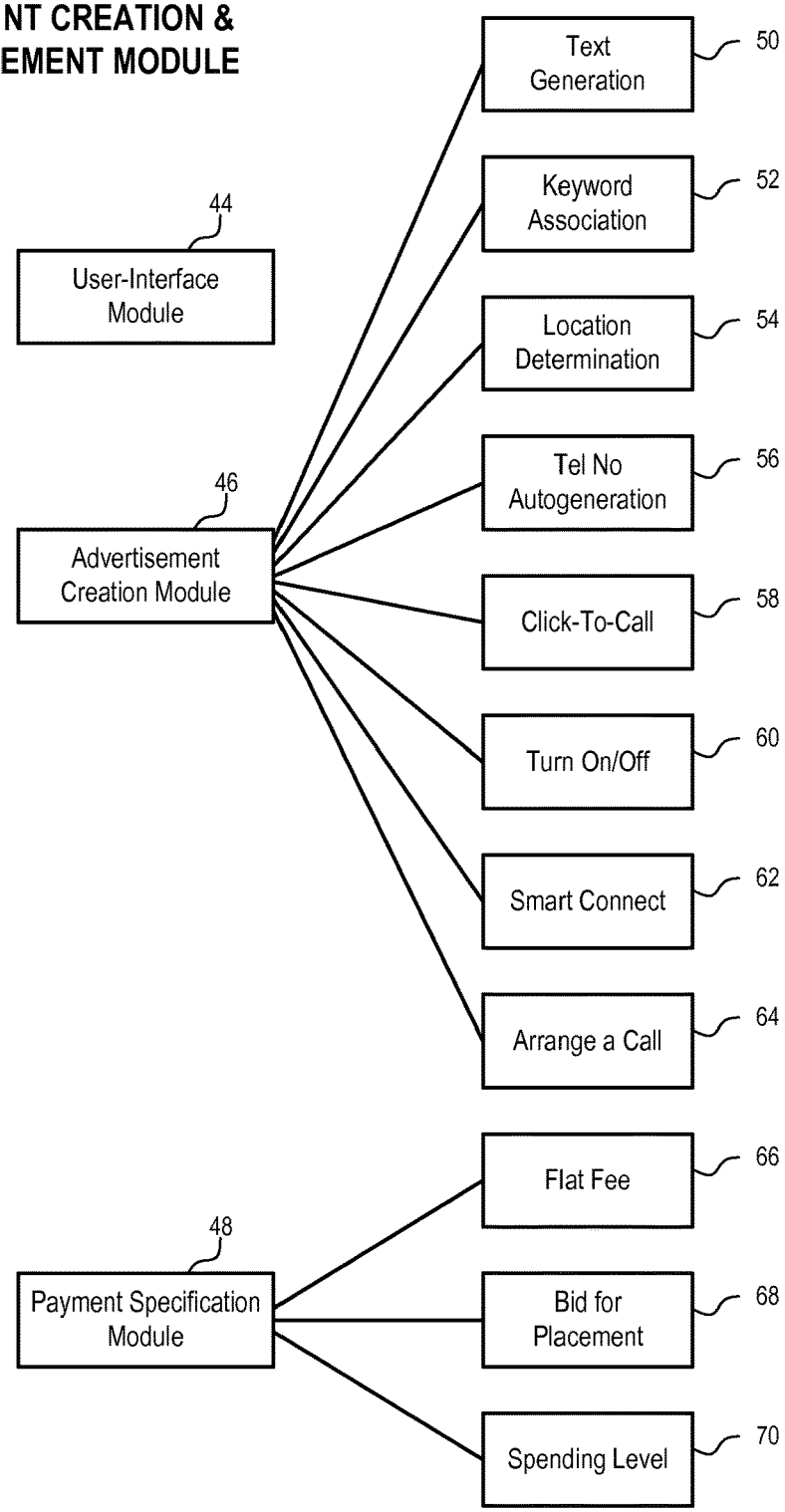
FIG. 5 illustrates the Account Creation and Management module of the system, in greater detail.
Figure 8B:
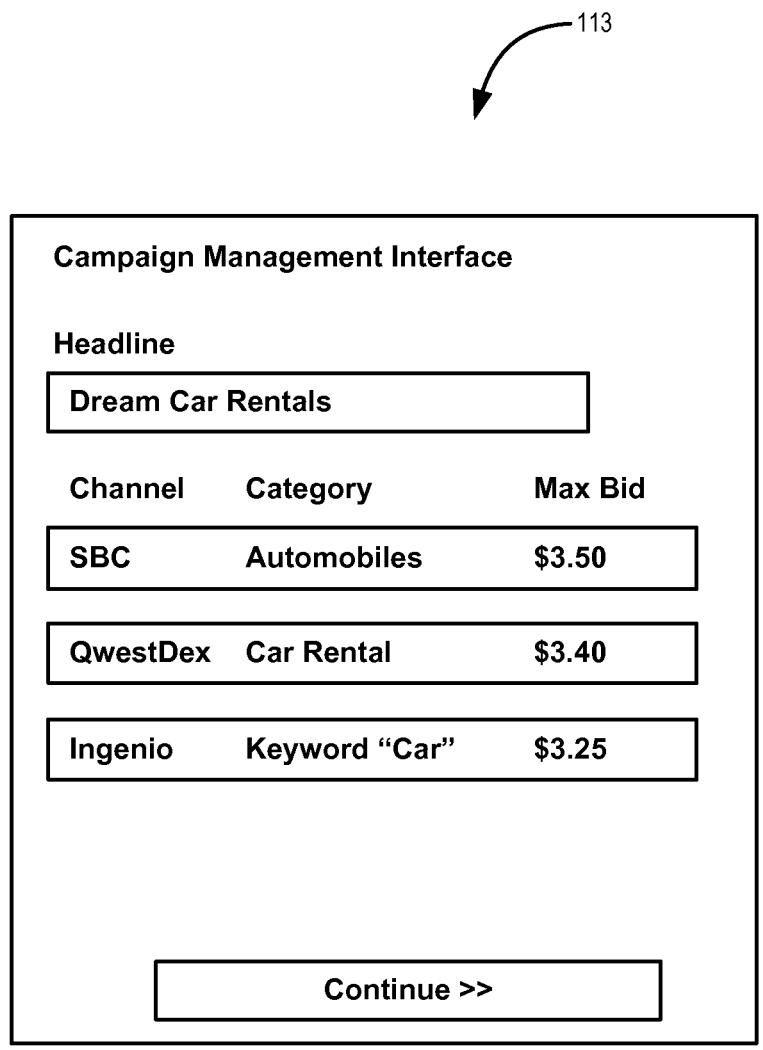
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or may not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
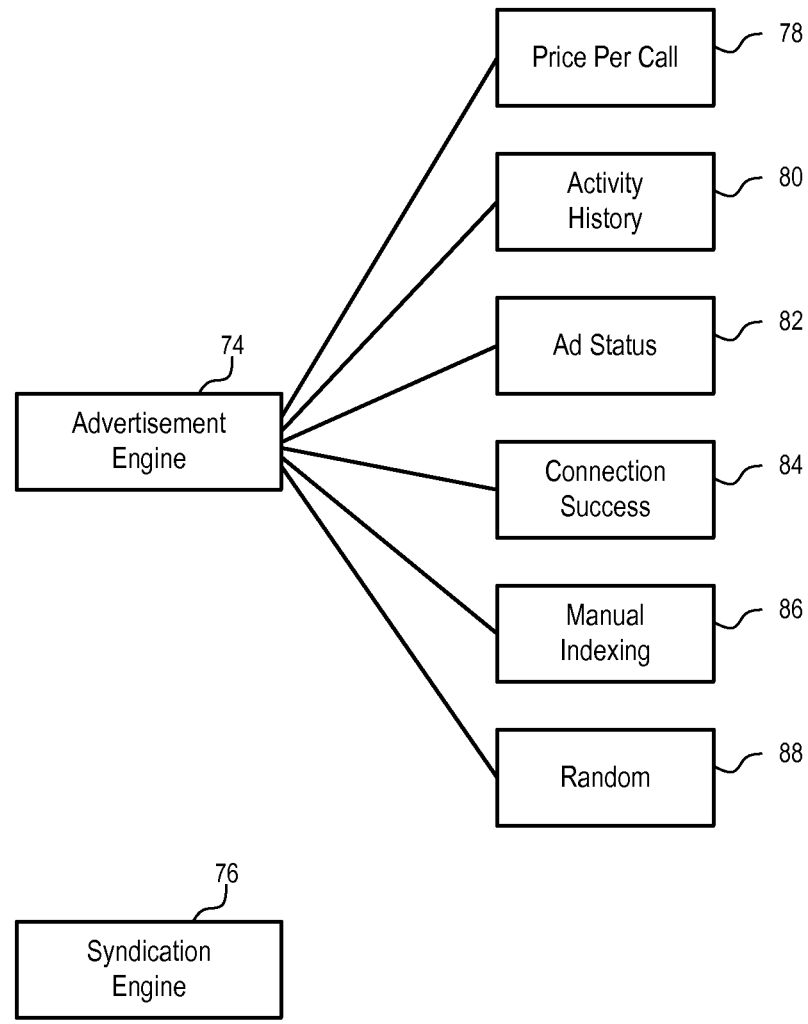
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
| --- | --- | --- |
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
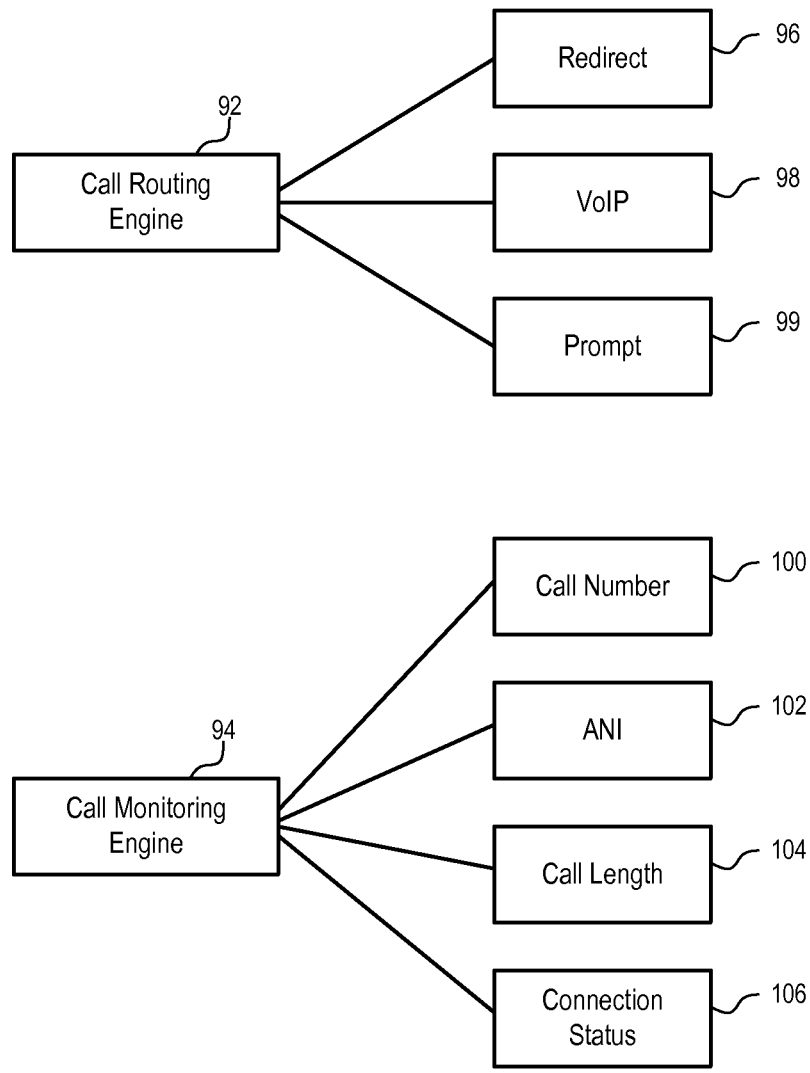
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
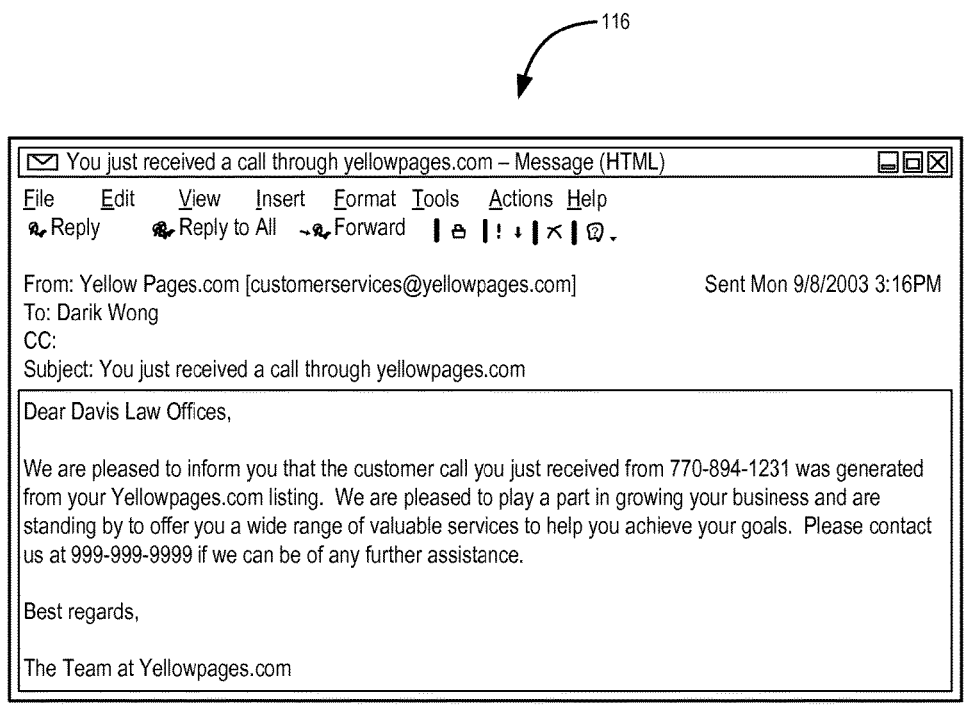
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
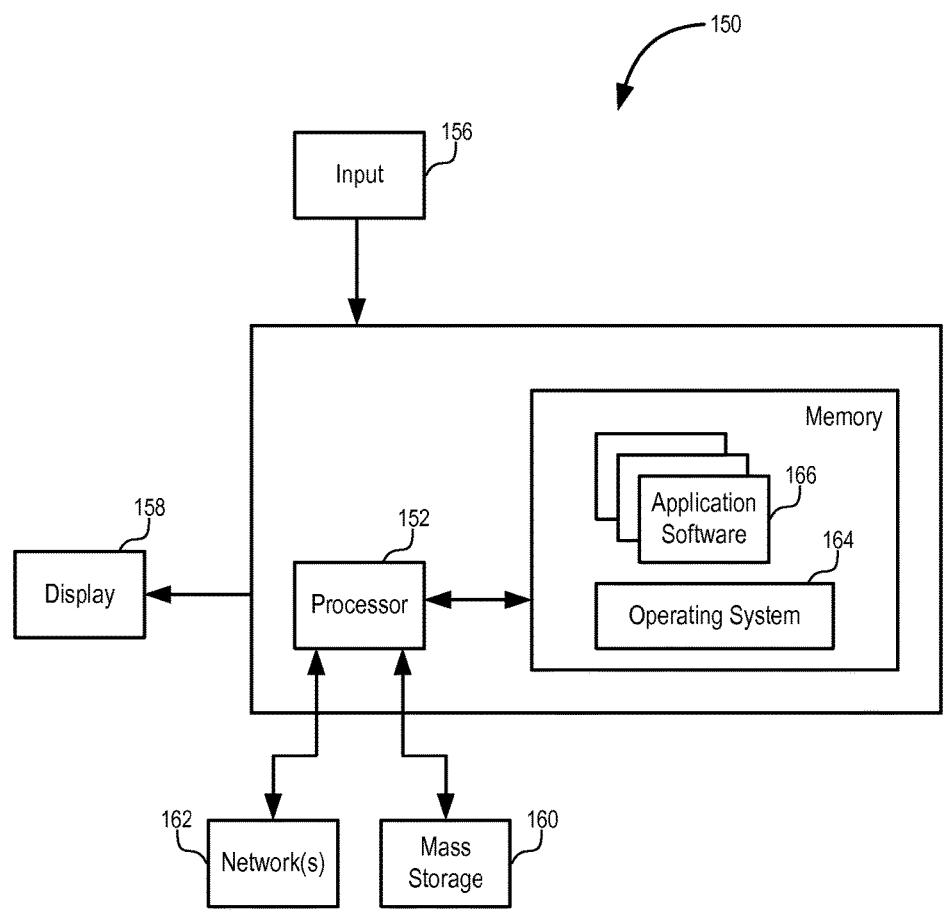
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
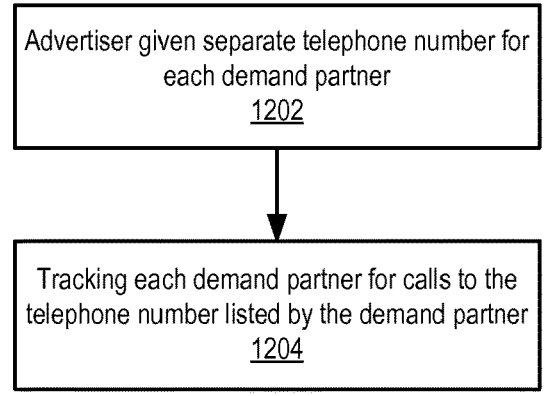
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
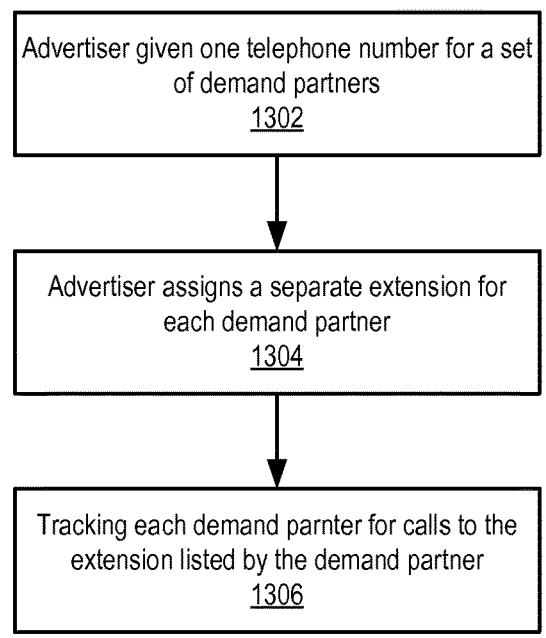

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
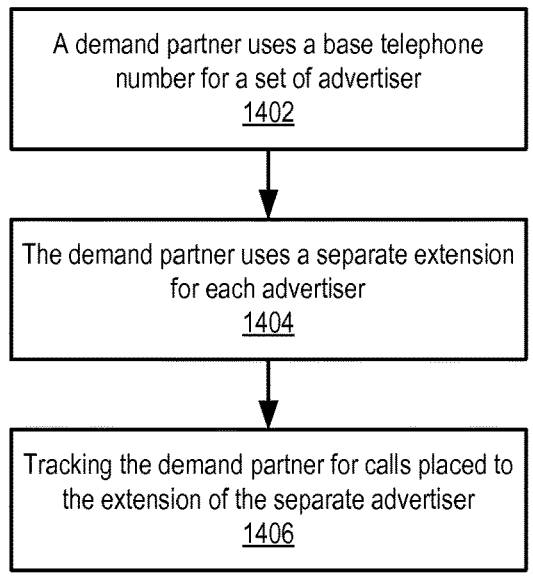

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
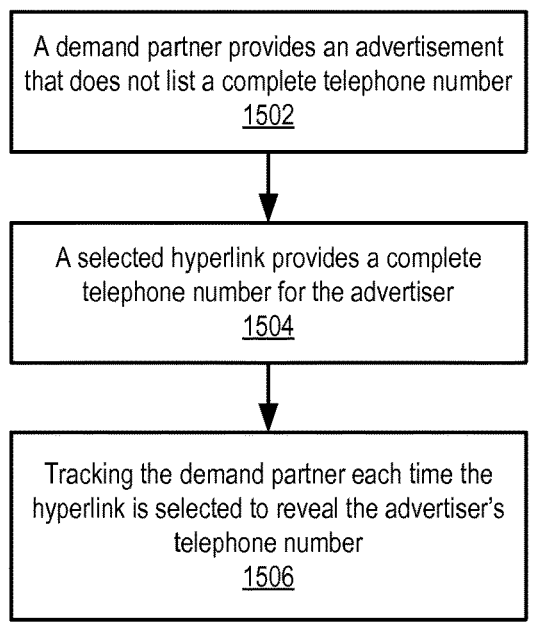

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
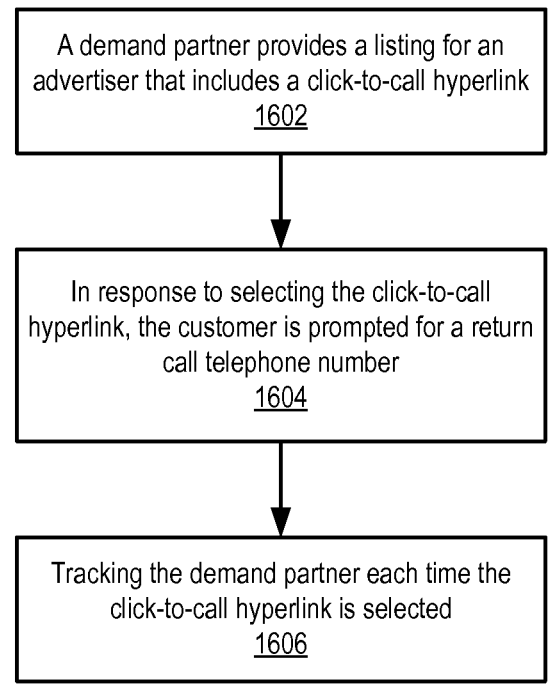

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
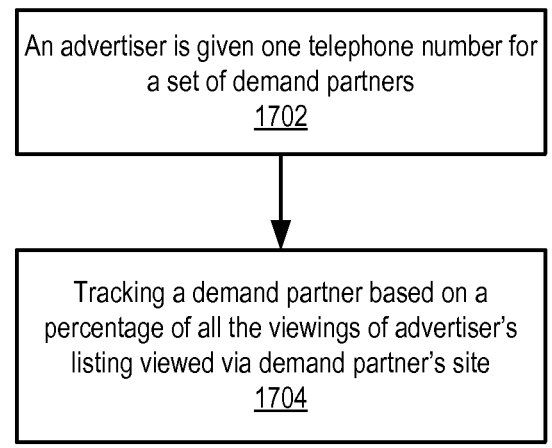

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
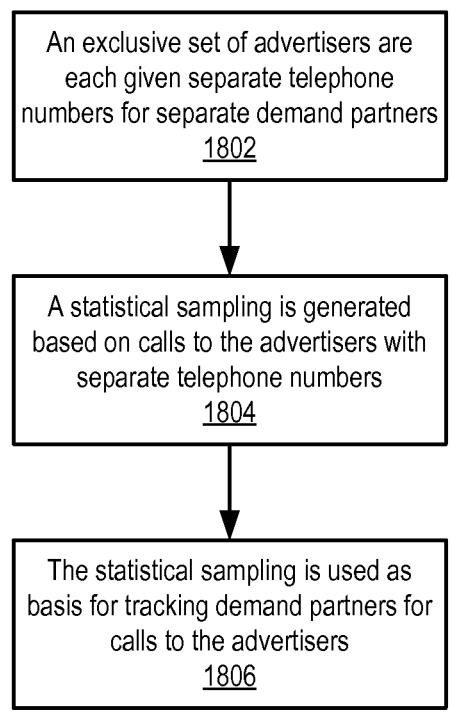

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
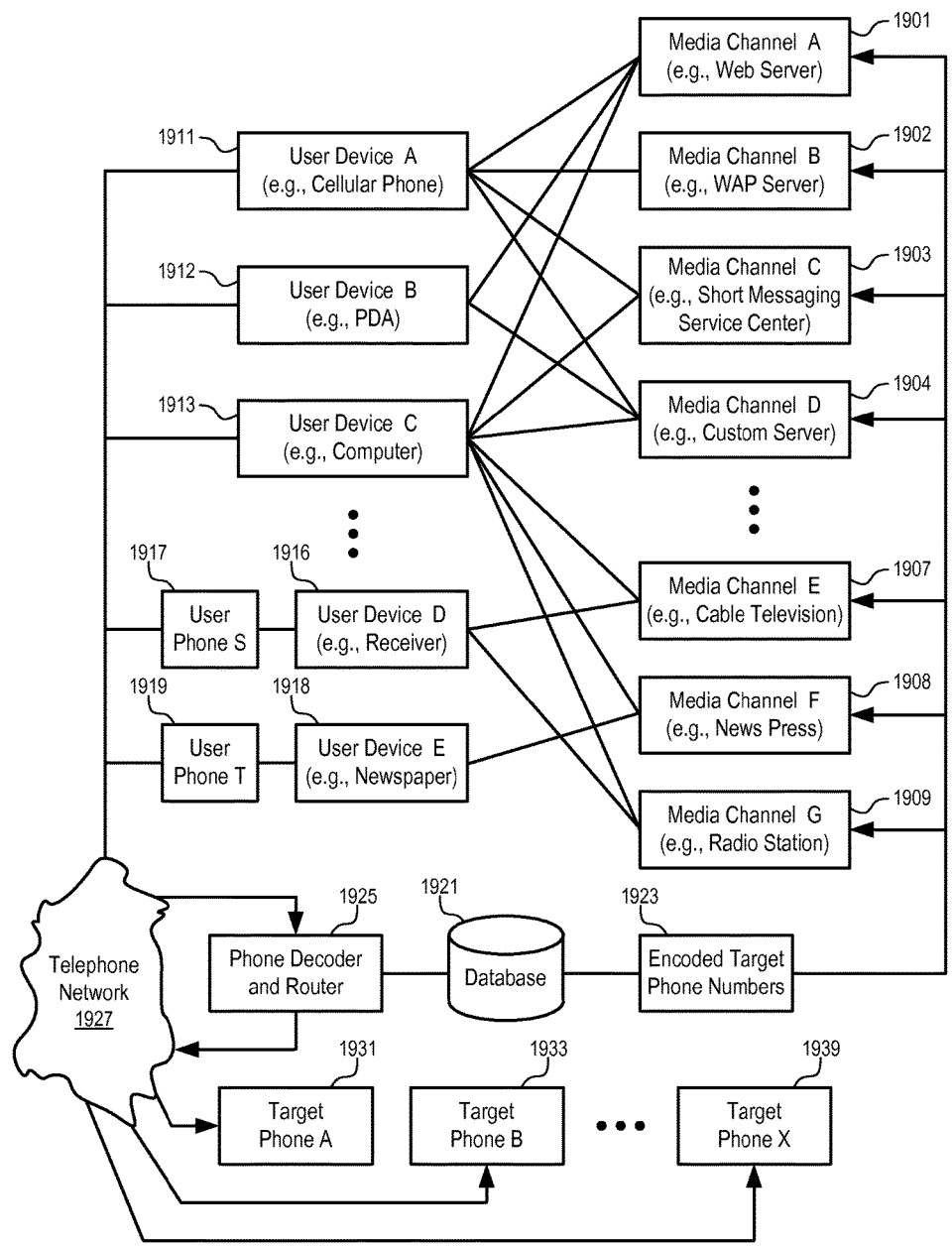
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encode target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Examples in a Marketplace and Auction Environment

In a marketplace environment (e.g., an online marketplace where items are sold through auction or fixed price purchase), sellers may hesitate to provide home phone numbers. If their phone numbers are published widely, they may fall into the hands of telemarketers or unrelated callers. Even regarding calls from viable customers, a seller may receive calls at inopportune times, such as the middle of the night, especially from customers browsing the marketplace from different time zones. Sellers do not want the phone to ring from the auction marketplace regardless of the hours of day and night.

However, real time communication can help the auction process, especially telephonic conversations.

One embodiment of the present invention uses the connection techniques that provide anonymity and availability control to allow a real time communication channel between the bidders and sellers in an auction environment. Wider adoption of telephonic connections in an auction environment can increase bids and revenue.

Figure 20:
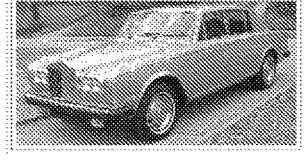
FIG. 20 illustrates an example of a user interface to provide telephonic connection for an auction listing according to one embodiment of the present invention.

In one embodiment, a telephonic connection service is used to provide live calling, voicemail, call scheduling, anonymity, availability control, etc., which are seamlessly integrated into an auction environment In one embodiment, an auction listing includes information to initiate a telephonic connection between a bidder and the seller. FIG. 20 illustrates an example of a user interface to provide telephonic connection for an auction listing according to one embodiment of the present invention.

For example, the information to initiate a phone connection can be in the form of a toll free number (2003) or a call button (2005) in an auction listing (2001). In one embodiment of the present invention, the auction listing does not include a direct telephonic contact information of the seller to provide anonymity for the seller.

In one embodiment, the system initiates a separate telephonic connection to the seller and then join the telephonic connection between the system and the bidder and the telephonic connection between the system and the seller to provide the connection between the bidder and the seller. In this way, the direct telephonic contact information of the bidder is shielded from the seller to provide anonymity for the bidder.

For example, when a user calls the toll free number (2003) (e.g., a 1-800 number or a phone number local to the user), the system identifies the seller based on the phone number dialed by the user (e.g., based on the toll free number and/or the extension dialed by the user). The system looks up a phone number of the seller (e.g., from a database) and initiates a separate phone call to the seller. Then, the system joins the phone connection to the seller with the phone connection to the user to connect the seller and the user while maintaining anonymity for both the seller and the user. The user can speak with the seller to get additional information needed to place bid or buy. The seller can also talk to the user to establish a relationship which may bring other opportunities for the seller. Thus, the seller may treat the phone connection as a lead to business.

In one embodiment, extensions are used in order to reduce the number of 800 numbers or local numbers used to provide for the sellers in the marketplace. For example, a root phone number can be used to be a branded experience, such as in 1-800-SHOP-NOW ext. 567. This root number plus extension enables a caller to contact a particular seller. In addition, based on the root number called customized telephonic IVR prompts can be played to the callers. For example: "Thank you for shopping with Shop Now, we are now connecting you to Seller Bob in the Antiques category. If this is not the seller you'd like to talk to, press # to hear a full directory." Customized IVR prompts can also be provided at the end of the call: "Now that you've finished your call with Seller Bob, press 1 to hear descriptions of items for sale in this same category."

In one embodiment, when the user clicks the call button (2005), the system shows a user interface (2101), illustrated in FIG. 21, to receive a callback phone number to connect a customer to a seller.

In one embodiment, the user interface (2101) is presented in a dialog box, which contains entry boxes (2103) to receive the telephone number of the user so that the system can call back the user at the user specified telephone number to establish the connection between the server and the user.

In one embodiment, the user interface (2101) further includes a check box (2107) to allow the user to specify whether or not the user is using the phone line to access the network with a modem. After the user presses the submit button (2105), the information collected in the user interface (2101) is transmitted to the system.

If the user is using the phone line to access the network, the system can wait for a period of time to allow the user to free up the phone line before trying to call the user at the user specified phone number; otherwise, the system may call the user immediately after receiving the phone number of the user (or after the system establishes the telephone connection with the seller).

In one embodiment, telephonic connection to at least one of the user and the seller is made through a VoIP connection. In one embodiment, at least part of the telephonic connection between the user and the seller is carried via VoIP. In one embodiment, a VoIP connection can also connect the caller directly to the seller to obviate the need for a second phone call.

In one embodiment, when the call button (e.g., 2005) is pressed, a VoIP application is invoked to request a telephonic connection to the seller. The request includes a reference to the seller; and the system uses the reference to established a telephonic connection to the seller according to the availability and schedule of the seller.

In one embodiment, the call button (or other part of the auction listing) provides the current availability information of the seller. In one embodiment, the call button and/or the phone number are presented only when the seller is available to take the call according to the schedule and instruction received from the seller.

In one embodiment, when the seller is not currently available to take a call (e.g., according to the schedule of the seller, or according to an indication from the seller at a time near when the connection is requested), the system can provide the user with an option to accept a callback within a time window and/or an option to schedule an appointment.

In one embodiment, if the seller is not available to take a call at the time the listing is being requested, the system provide an option to accept a callback within a time window and/or an option to schedule an appointment in the listing. For example, the listing may show a "call back in a time window" button and/or a "make a call appointment" button.

The connection methods can also be applied to other types of real time communication systems, such as instant messaging, video conferencing, etc. In one embodiment, various communication channels, such as SMS, chat (text and/or voice), instant message, email, video conference, voice mail, email, etc., can be provided when requested. In one embodiment, multiple channels of communication can be provided in combination.

The real time communication connection (e.g., telephonic connection, instant messaging connection, video conferencing connection, etc.) allows the user of the auction system to obtain additional and immediate information that is not on the listing. The user can talk to the seller to ask question about auction item, which can be especially helpful for high priced or complex products where details may be difficult to convey thoroughly on Web.

In one embodiment, the marketplace uses the communication system to control "gray-market activity." Such gray-market activity involves buyers and sellers contacting each other outside the bounds of the system, such as dialing a cell-phone number on a listing, and arranging sales and payment directly, enabling them to avoid paying the commission fees of the marketplace. To prevent this, the marketplace can use the system to record phone calls and identify those sellers partaking in gray-market activity, thereby recouping commission fees or banning them from the marketplace. The marketplace can monitor calls selectively or randomly, or only the calls of suspicious sellers. The marketplace could use voice-recognition software to automatically listen for words indicating gray-market activity, such as "payment" or "credit-card number." Upon hearing such words, the recorded conversation can be automatically highlighted to a manager for review.

In one embodiment, the telephonic connection is free of charge to the user of the auction system.

In one embodiment, the sellers can use the auction listing as a marketing platform. Thus, the telephonic calls generated from the auction listing serve as a kind of advertisement that can be valuable to the sellers.

Figure 22:
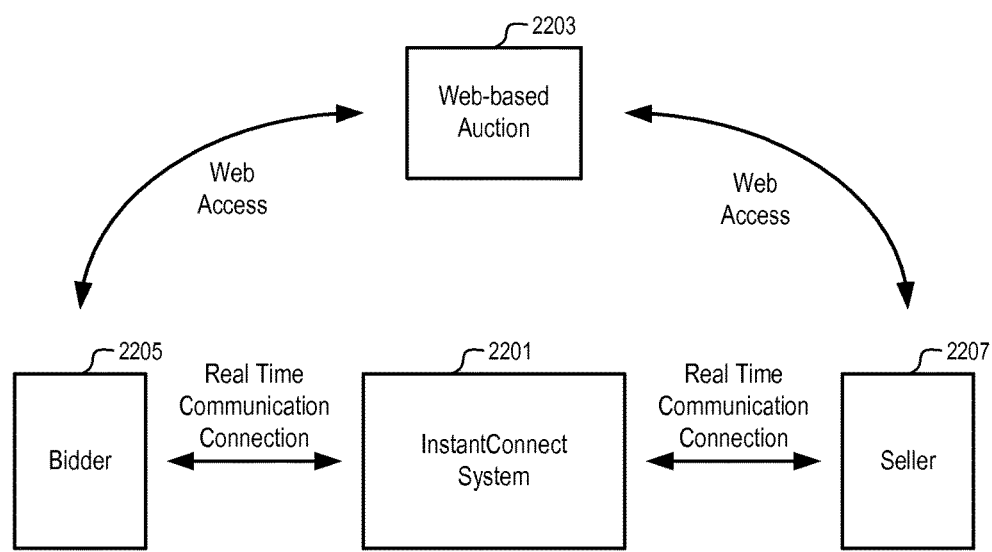
FIG. 22 illustrates a system to provide an anonymous real time communication channel to connect a bidder to a seller according to one embodiment of the present invention.

FIG. 22 illustrates a system to provide an anonymous real time communication channel to connect a bidder to a seller according to one embodiment of the present invention. In FIG. 22, the web-based auction (2203) provides an online marketplace for the seller (2207) to reach the bidder (2205). The web-based auction (2203) provides a listing that includes information for the bidders to request a real time communication connection to the seller (2207) through the system (2201).

In one embodiment, a request for the real time communication can be a phone call to a phone number of the system (2201) which is assigned to the seller (2207), or a message sent to the system (2201) (e.g., through a web site, through a VoIP system, through an SMS messaging system, or through other types of communication protocols).

Figure 23:
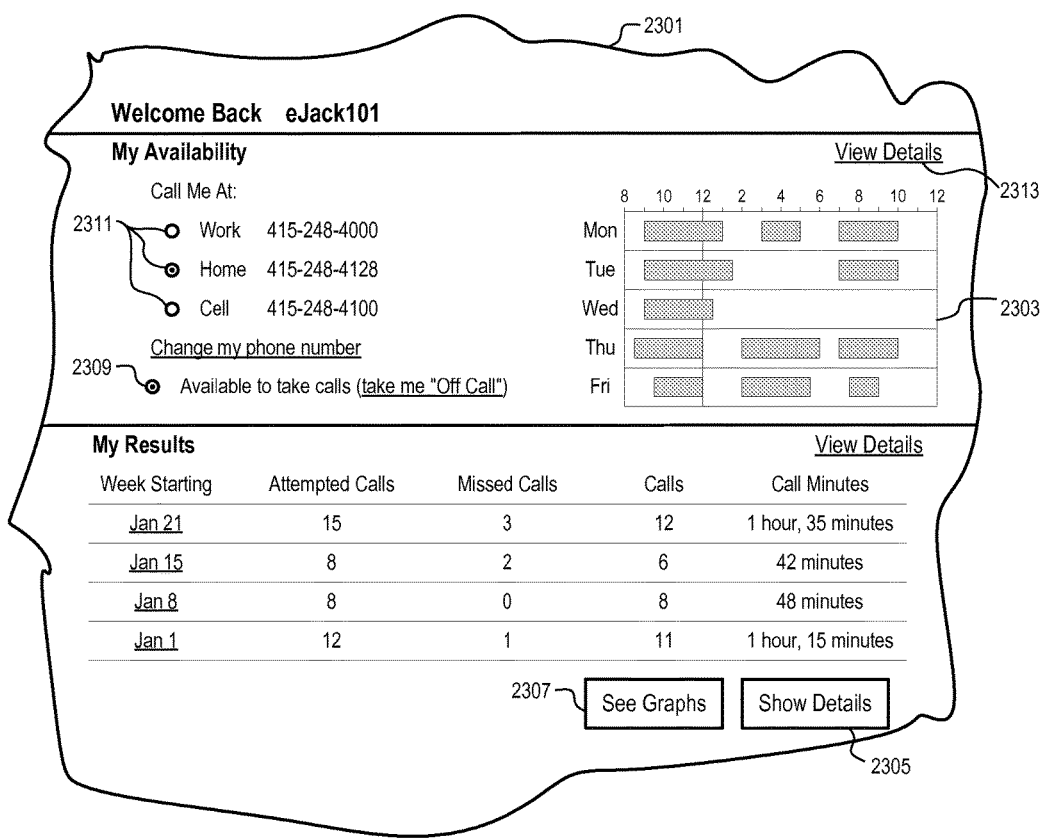
FIG. 23 illustrates an example of a user interface to manage availability for receiving phone calls according to one embodiment of the present invention.

FIG. 23 illustrates an example of a user interface to manage availability for receiving phone calls according to one embodiment of the present invention.

In one embodiment, the system to make the telephonic connection is very flexible and feature rich. They system provides the capability for automatic call-back, real time call tracking, and/or availability management & scheduling.

In one embodiment, the system can store multiple phone numbers of the seller. The system can intelligent route a call to the seller according to the preference of the seller. For example, in FIG. 23, the seller may choose a preferred phone number from a set of phone numbers of the seller to receive incoming calls using the option group (2311) in the user interface (2301). The seller may indicate whether the seller is currently available to take calls or is to be taken "off call" (e.g., using the check box (2309)).

In one embodiment, the system allows the seller to specify the schedule to receive calls; and the schedule (2303) is displayed to the seller in a graphical way to help the seller to manage calls.

In one embodiment, the user interface (2301) includes a link (2313) which can be selected to display a user interface (not shown in FIG. 23) to manage the schedule (2303).

In one embodiment, the user interface (2301) includes a summary of call activities. Buttons (2307 and 2305) can be selected to show graphical representation of the call activities and further details of the call activities.

In one embodiment, the phone call passes through the system, which allows the collection of a wide array of information, including day/date/time of calls, duration of calls, call status (answered, no answer, busy), inbound phone numbers, etc.

In one embodiment, the sellers are charged for the telephonic connection service on a per auction item basis, or a per month/year basis. The price may be a function of the value of the auctioned item. An pricing example is shown below.

| Item Value | Per Auction | Per Month | Per Year |
|---|---|---|---|
| >$1000 | $15 | $60 | $600 |
| $100-$1000 | $10 | $40 | $400 |
| $0-$100 | $ 5 | $20 | $200 |

In one embodiment, the fee for the telephonic connection is automatically charged to the buyer or seller based on a per-minute usage price.

In one embodiment, the telephonic lead can be valuable to the sellers; and the sellers are charged for the telephonic lead on a per call basis (or a per qualified call/phone lead basis). For example, when multiple calls are made from the same user to the same seller within a period of time (e.g., a day or a week), or in connection with the same auctioned item, these multiple calls can be considered as one qualified call or a single phone lead.

In one embodiment, the phone leads are auctioned so that the sellers may specify the price bids on the phone leads they will receive.

In one embodiment, the sellers may provide services. It may be tougher for buyer and seller to discern the value of a service (a roofing project, unclogging a sink etc.). Some services may be harder to dispense electronically. Many times a face-to-face visit is needed. Most services cannot be shipped. Frequently, payment of service is determined and made after the service is performed, while the price of a physical object may be determined before the delivery. However, sellers of services have higher regard for relationship with Buyer for the reason of repeat activity. Thus, providing a pay-per-call performance based listing service can be very attractive to such sellers.

In one embodiment, phone leads to be generated from presenting information (e.g., auction listings, service listings, advertisements, etc.) on behalf of the sellers/advertisers are auctioned. In one embodiment, the seller pays for leads that are email based. For example, a customer may fill out a form with his needs and specifications for the project; and the seller pays for the lead that arrives via email (or SMS, or instant message). In one embodiment, the seller who bids the most per lead, among the relevant sellers, can be selected to receive the best placement in the marketplace.

In one embodiment, service providers are provided with an online marketplace to bid for phone calls from qualified prospective customers in their geographic region. The service providers bid for phone calls where the bid price will efficiently capture the long term value of new clients and maximize revenue to online market place.

In one embodiment, the bidding for the phone loads is based on a localized environment that connects service providers with buyers in their local market. In the business practices of many service providers, the phone connection is a primary contact point with prospective clients. Thus, the value of the phone leads conforms to the business practice of the business practices.

Figure 24:
FIG. 24 illustrates an example of a user interface to provide telephonic connections for listings according to one embodiment of the present invention.

FIG. 24 illustrates an example of a user interface to provide telephonic connections for listings according to one embodiment of the present invention. In FIG. 24, the user can search for or browse listings using the navigation panel (2403) in the user interface (2401), which can be implemented as a web page. The selected list of listings are presented with information to request a telephonic connection, such as a telephone number (2405) that can be used to call a server which can identify the seller from the telephone number (2405) dialed and then arrange a telephonic connection between the caller and the seller.

In one embodiment, sellers (e.g., service providers) create listings in specific categories and geographies, and bid for phone calls from consumers. The listings may or may not relate to an auctioned item (e.g., a product and/or a service). For example, the listing may be an auction listing that is designed as an advertisement tool to attract potential customers. The auction listing may be about a specific service package or product to be auctioned. Alternatively, for example, the listing may be a simple advertisement listing that describing the service offered without an auctioned item.

In one embodiment, the listing presented to the customers includes references to initiate calls in a way trackable to measure the number of calls generated from presenting the listing. For example, a reference embedded in the listing can be a 1-800 phone number of a system, which is assigned/associated to the seller. When the 1-800 phone number is called, the system connects/forwards/redirects the call to an actually phone number of the seller (advertiser). The system can capture the call activities and determine the number of phone leads generated by the advertisement. The sellers (advertisers) can then be charged at the rate they have specified. Alternatively, a reference embedded in the listing can be a phone number that has an extension. Alternatively, a reference can be a SIP address for the initiation of a VoIP-based call. Alternatively, a reference can be a user ID of a messaging system.

In one embodiment, sellers (e.g., service providers) are provided with a variety of tools that allow them to: create and modify listings, designate category and desired geography, manage bids, track call activity, etc.

Figure 25:
FIG. 25 illustrates an example of a user interface to submit bids on telephonic leads according to one embodiment of the present invention.

FIG. 25 illustrates an example of a user interface to submit bids on telephonic leads according to one embodiment of the present invention.

In FIG. 25, the user interface (2501) includes a list of bids for phone calls generated from the advertisement (e.g., auction listing, service listing, product listing, etc.) in a geography (e.g., Los Angeles, Calif. (2515)).

In one embodiment, the user interface allows the seller to selectively view the bids in a hierarchy of categories. The example in FIG. 25 shows a list of top bids from the category "contractors". The user interface (2501) shows a link (2517) allows the seller to view the bids in the sub-category "Plumbers" of the category "contractors", since the listing of the seller ("Jim's Professional Plumbing") (2519) is in the sub-category "Plumbers" of the category "contractors".

The user interface (2501) shows a list of top bids from the selected category/topic of listings, such as a bid of $13/call (2503) from "L.A. Roofing Specialists". The seller (of "Jim's Professional Plumbing") may choose to view bids in different categories to decide a bid (2505) for phone leads generated from the listing "Jim's Professional Plumbing".

In one embodiment, the listings are organized according to a hierarchy of categories or topics. A listing may be in one or more of the categories or topics. The bids are presented according to the categories or topics and the geographical areas.

Alternatively, a search based on a match to key words can be used to select the list of bids for comparison. For example, a listing may include a number of key words, a title, a description, etc., that are searchable. When one or more key words are submitted as the search criteria, a search engine can determine matching listings that are sorted according to the relevancy of the listings to the submitted search criteria. The search criteria may include a specification of a local geographical area of interest. Thus, the seller can perform a search in a way similar to a user of a search engine to view the bids of the potential competitors. Using the bid information for similar sellers found in a search, the seller can determine an appropriate price bid for the phone leads received from the listing of the seller.

In FIG. 25, the seller can specify when the bid of the seller expires. For example, the seller may choose to be promoted whenever the seller is available or stop being promoted after a specified amount has been spent, using the option buttons (2509 and 2511). The entry box (2507) can be used to specify an advertisement budget. Various other criteria can also be used to specify when the bid expires. For example, the bid expiration can be based on a time period, or based on number of calls received, or based on availability of the seller to receive calls, or based on the advertisement budget (e.g., for each week, for each month, for each year, etc.), or a combination of criteria.

FIG. 26 illustrates an example of a user interface to track call activities according to one embodiment of the present invention. In FIG. 26, a specific time period can be specified to view the call activities. In one embodiment, a seller can have multiple listings; and the user interface allows the seller to view call activities related to a particular listing or call activities for all of the listings of the seller. The seller may choose a type of calls as a filter in viewing the call activities. In one embodiment, the displayed details of the call activities include call date, amount charged, the next highest bid, amount bid, etc.

In one embodiment, the seller can specify an amount of maximum bid for a listing to allow the system to automatically bid for the seller. For example, the system can automatically adjust the bid amount, in an individual opportunity to present listings, to increase the position of the listing of the seller without exceeding the amount of maximum bid.

In one embodiment, the seller may further specify a desired position for the automatic bid. For example, the seller may wish to be on the top five; and the system may automatically adjust the bid to attempt to move the seller to the top five in a search result, under the constraint of the amount of maximum bid.

In one embodiment, a system includes various modules to provide the services according to embodiments of the present invention. For example, a system may include one or more of:

1. advertisement/listing creation and modification module;
2. payment specification (fixed or bidding) capability;
3. intelligent listings serving module;
4. call switching and tracking module;
5. call activity data warehouse and reporting module; and
6. payment collection, remittance module.

In one embodiment, the modules are configurable, reliable and scalable with multiple access points.

Figure 27:
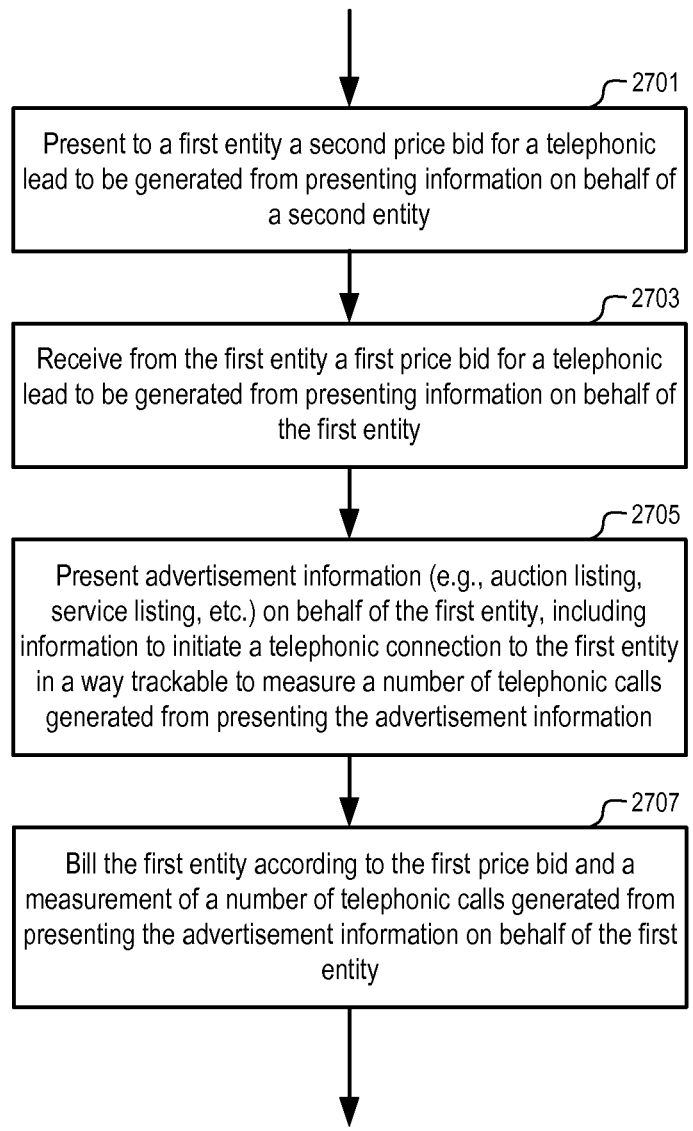
FIGS. 27-29 show flow diagrams of methods to connection people according to embodiments of the present invention.
Figure 28:
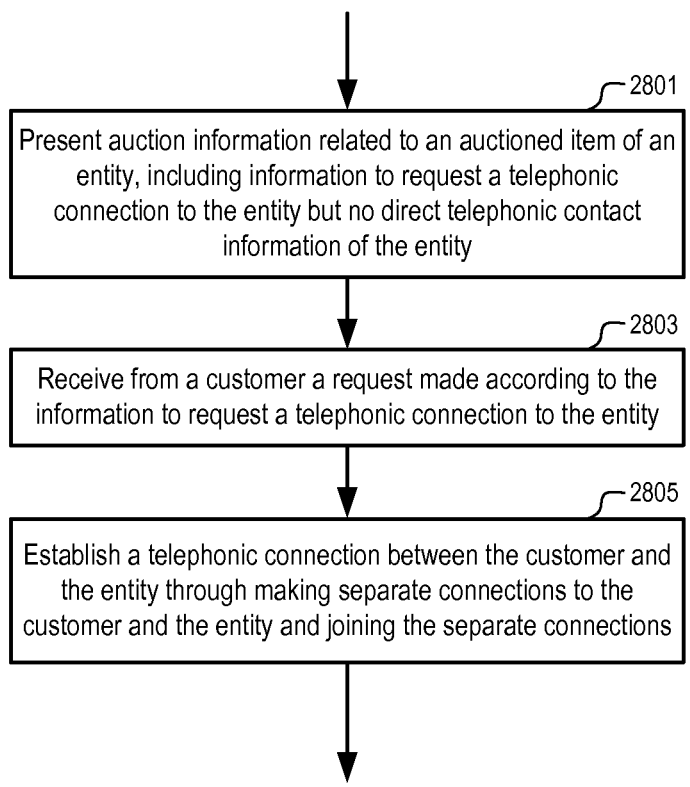
Figure 29:
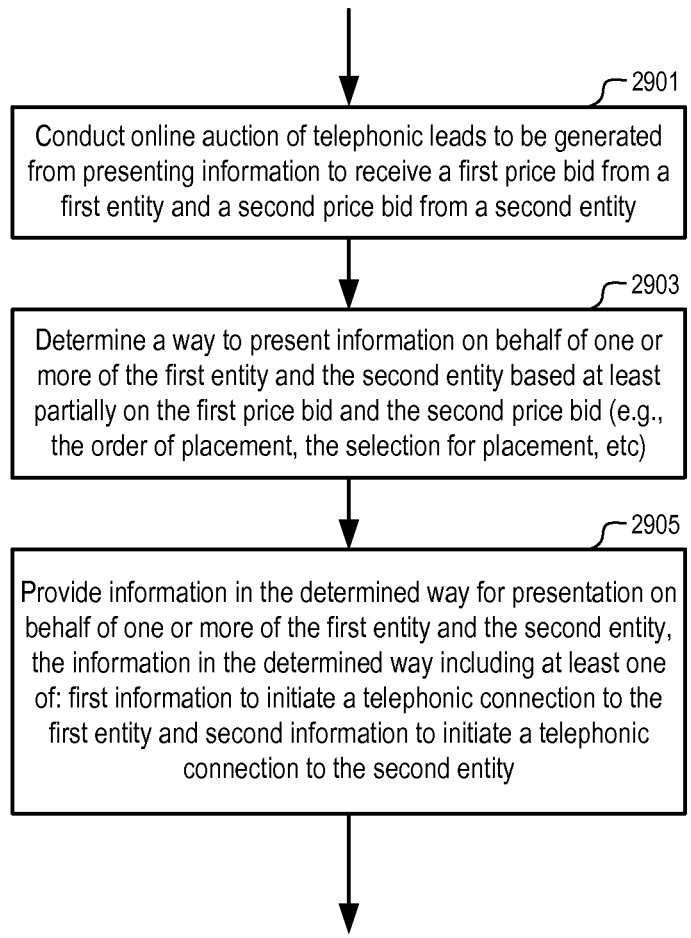

FIGS. 27-29 show flow diagrams of methods to connection people according to embodiments of the present invention.

In FIG. 27, operation 2701 presents to a first entity a second price bid for a telephonic lead to be generated from presenting information on behalf of a second entity. Operation 2703 receives from the first entity a first price bid for a telephonic lead to be generated from presenting information on behalf of the first entity. Operation 2705 presents advertisement information (e.g., auction listing, service listing, etc.) on behalf of the first entity, including information to initiate a telephonic connection to the first entity in a way trackable to measure a number of telephonic calls generated from presenting the advertisement information. Operation 2707 bills the first entity according to the first price bid and a measurement of a number of telephonic calls generated from presenting the advertisement information on behalf of the first entity.

In FIG. 28, operation 2801 presents auction information related to an auctioned item of an entity, including information to request a telephonic connection to the entity but no direct telephonic contact information of the entity. Operation 2803 receives from a customer a request made according to the information to request a telephonic connection to the entity. Operation 2805 establishes a telephonic connection between the customer and the entity through making separate connections to the customer and the entity and joining the separate connections. The separate connections can be initiated via VoIP. Alternatively, in response to the request from the customer, a VoIP system may be used to directly connect the customer to the entity, with or without the use of a circuit switched network in the connection.

In FIG. 29, operation 2901 conducts online auction of telephonic leads to be generated from presenting information to receive a first price bid from a first entity and a second price bid from a second entity. Operation 2903 determines a way to present information on behalf of one or more of the first entity and the second entity based at least partially on the first price bid and the second price bid (e.g., the order of placement, the selection for placement, etc). Operation 2905 provides information in the determined way for presentation on behalf of one or more of the first entity and the second entity, the information in the determined way including at least one of: first information to initiate a telephonic connection to the first entity and second information to initiate a telephonic connection to the second entity. In one embodiment, the information to initiate a telephonic connection is such that telephonic connections initiated using the information can be monitored to determine the number of phone calls generated from presenting listings on behalf of an entity, which is then charged according the price bid and the phone calls generated. The information can be a telephone number to a server and assigned to the entity, or a link to a server with a reference to the entity and/or the listing, or a button with a reference to the entity and/or the listing, etc.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
    transmitting visible content, by a server system, via a network to a first end-user device to display the visible content via a user interface, of a display device of the first end-user device prompting input specifying pricing information for one or more listings associated with a first entity;
    collecting a geolocation, detected by a location device, of the first end-user device;
    receiving a first transmission from the first end-user device, by the server system, to (a) identify a first price bid from the first entity for a first listing, and (b) determine a geographic area corresponding to (i) the detected geolocation of the first end-user device and (ii) a detected location associated with the first listing, of the one or more listings;
    accessing a database of the server system to retrieve the first reference from a pool of unallocated references, not preassigned to a particular listing, and assigning, by the server system, the first reference to a first demand partner and a first version of the first listing;
    accessing the database to retrieve the second reference from the pool of unallocated references, and assigning, by the server system, the second reference to a second demand partner and a second version of the first listing;
    establishing a real time communication connection by routing, via the server system, a telephone call, via a Voice over Internet Protocol, to the first end-user device associated with the first entity in response to detecting an indication of a selection, via the user interface, of at least one of the first reference and the second reference;
    transmitting via the network, by the server system, the first version of the first listing to the first demand partner, the first version of the first listing comprising the first reference, the first listing comprises information related to a first item of the first entity;
    transmitting via the network by the server system the second version of the first listing to the second demand partner; and
    after a first predetermined time period that is based on a first time corresponding to the transmitting the first version of the first listing, changing, by the server system, an assignment of the first reference stored in the database so that the first reference is recycled into the pool of unallocated references for subsequent reassigning to another entity.

2. The method of claim 1, further comprising:
    after a second predetermined time period that is based on a second time corresponding to the transmitting the second version of the first listing, changing by the server system an assignment of the second reference stored in the database such that the second reference is recycled into the pool of unallocated references for subsequent reassigning to another entity.

3. The method of claim 1, wherein the real time communication comprises a telephonic lead.

4. The method of claim 3, wherein the first price bid is for a telephonic lead to be generated from presenting information on behalf of the first entity.

5. The method of claim 4, further comprising:
    presenting second information related to a second item of a second entity, the second information of the second entity comprising information to request a telephonic connection to the second entity.

6. The method of claim 5, wherein the second information of the second entity comprises no direct telephonic contact information of the second entity; and the method further comprises:
    receiving from a second customer a request for the telephonic connection to the second entity; and
    according to a schedule of the second entity, establishing the telephonic connection between the second customer and the second entity through making separate connections to the second customer and the second entity and joining the separate connections.

7. The method of claim 4, wherein the first item of the first entity comprises at least one of a product or a service.

8. The method of claim 4, further comprising:
    billing the first entity according to a measurement of a number of telephonic calls initiated via the first reference.

9. The method of claim 8, wherein the first reference comprises a telephone number of a server and the telephone number is assigned to the first entity; the method further comprising:
    receiving a telephonic call from a second customer, by the server, at the telephone number;
    establishing a telephonic connection to the first entity by making a separate telephonic call to the first entity; and
    bridging the telephonic call from the second customer with the telephone connection to the first entity to connect the second customer and the first entity.

10. The method of claim 4, further comprising:
    determining a way to present information on behalf of the first entity based at least partially on the first price bid.

11. The method of claim 10, wherein the determining of the way to present information comprises determining an order of placement of first information to be presented on behalf of the first entity relative to placement of second information to be presented on behalf of a second entity, based at least partially on the first price bid and a second price bid of the second entity.

12. The method of claim 11, further comprising:
performing a search to determine a result comprising the first information to be presented on behalf of the first entity.

13. The method of claim 12, wherein the search is based at least partially on user specified search criteria on a geographical area.

14. The method of claim 11, wherein the determining of the way to present information comprises selecting information to be presented at an advertisement location based at least partially on the first price bid and a second price bid of the second entity.

15. The method of claim 10, further comprising:
providing information to initiate a first telephonic connection to the first entity in the way determined for presentation on behalf of the first entity.

16. A non-transitory machine readable storage media storing instructions, the instructions, when executed by a server system, cause the server system to:
transmit visible content via a network to a first end-user device to display the content via a user interface, of a display device of the first end-user device, prompting with an application to prompt input specifying pricing information for one or more listings associated with a first entity;
collect a geolocation, detected by a location device, of the first end-user device;
receive a first transmission from the first end-user device by the server system to (a) identify a first price bid from the first seller for a first listing, and (b) determine a geographic area corresponding to (i) the detected geolocation of the first end-user device and (ii) a detected location associated with the first listing, of the one or more listings;
access a database of the server system to retrieve a first reference from a pool of unallocated references, not preassigned to a particular listing, and assign the first reference to a first demand partner and a first version of the first listing;
access the database to retrieve a second reference from the pool of unallocated references, and assign the second reference to a second demand partner and a second version of the first listing;
establish a real time communication connection by routing a telephone call, via a Voice over Internet Protocol, to the first end-user device associated with the first seller in response to detecting an indication of a selection, via the user interface, of at least one of the first reference and the second reference;
transmit via the network by the server system the first version of the first listing to the first demand partner, the first version of the first listing comprising the first reference, and the first listing comprises information related to a first item of the first entity;
transmit via the network, by the server system, the second version of the first listing to the second demand partner; and
after a first predetermined time period that is based on a first time corresponding to the transmitting the first listing, changing by the server system an assignment of the first reference stored in the database such that the first reference is recycled into the pool of unallocated references for subsequent reassigning to another entity.

17. The non-transitory machine readable storage media of claim 16, wherein the instructions, when executed by the server system, further causes the server system to:
after a second predetermined time period that is based on a second time corresponding to the transmitting the second version of the first listing, changing by the server system an assignment of the second reference stored in the database such that the second reference is recycled into the pool of unallocated references for subsequent reassigning to another entity.

18. The non-transitory machine readable storage media of claim 16, wherein the instructions, when executed by the server system, further causes the server system to:
present second information related to a second item of a second entity, the second information of the second entity comprising information to request a telephonic connection to the second entity.

19. A server system comprising:
one or more servers comprising memory storing instructions; and
at least one processor of the one or more servers coupled to the memory, the processor to execute the instructions to cause the server system to:
transmit visible content via a network to a first end-user device to display the content via a user interface, of a display device of the first end-user device, prompting with an application to prompt input specifying pricing information for one or more listings associated with a first entity;
collect a geolocation, detected by a location device, of the first end-user device;
receive a first transmission from the first end-user device to (a) identify a first price bid from the first seller for a first listing, and (b) determine a geographic area corresponding to (i) the detected geolocation of the first end-user device and (ii) a detected location associated with the first listing, of the one or more listings;
access a database of the server system to retrieve a first reference from a pool of unallocated references, not preassigned to a particular listing, and assign the first reference to a first demand partner and a first version of the first listing;
access the database to retrieve a second reference from the pool of unallocated references, and assign the second reference to a second demand partner and a second version of the first listing;
establish a real time communication connection by routing a telephone call, via a Voice over Internet Protocol, to the first end-user device associated with the first seller in response to detecting an indication of a selection, via the user interface, of at least one of the first reference and the second reference;
transmit, via the network, the first version of the first listing to the first demand partner, the first version of the first listing including the first reference, and the first listing comprises information related to a first item of the first entity;
transmit, via the network, the second version of the first listing to the second demand partner; and
after a first predetermined time period that is based on a first time corresponding to the transmitting the first listing, changing an assignment of the first reference stored in the database such that the first reference is recycled into the pool of unallocated references for subsequent reassigning to another entity.

20. The server system of claim 19, wherein the processor of the one or more servers further executes the instructions to cause the server system to:
after a second predetermined time period that is based on a second time corresponding to the transmitting the second version of the first listing, changing by the server system an assignment of the second reference stored in the database such that the second reference is recycled into the pool of unallocated references for subsequent reassigning to another entity.

* * * * *